United States Patent
Yamaguchi et al.

(10) Patent No.: US 6,278,195 B1
(45) Date of Patent: *Aug. 21, 2001

(54) POWER OUTPUT APPARATUS, ENGINE CONTROLLER, AND METHODS OF CONTROLLING POWER OUTPUT APPARATUS AND ENGINE

(75) Inventors: Katsuhiko Yamaguchi; Masaaki Yamaoka, both of Toyota; Takeshi Kotani, Nissin; Shoichi Sasaki, Mishima; Toshifumi Takaoka, Anjo; Hiroshi Kanai, Susono, all of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,151

(22) Filed: Oct. 27, 1997

(30) Foreign Application Priority Data

Oct. 29, 1996 (JP) .................................................. 8-303950
Mar. 7, 1997 (JP) .................................................. 9-070800

(51) Int. Cl.⁷ .............................. F02N 11/06; H02P 9/04
(52) U.S. Cl. .................. 290/40 A; 290/40 R; 290/40 B; 290/40 C; 290/40 D; 290/40 F
(58) Field of Search .................. 290/40 A, 40 F, 290/40 R, 40 D; 477/2, 3, 5; 180/65.2, 65.6

(56) References Cited

U.S. PATENT DOCUMENTS

| | | | |
|---|---|---|---|
| 4,407,132 | 10/1983 | Kawakatsu et al. | |
| 4,951,769 | * 8/1990 | Kawamura | 180/65.4 |
| 5,142,903 | * 9/1992 | Mizushima et al. | 73/118.1 |
| 5,258,651 | 11/1993 | Sherman | |
| 5,558,588 | * 9/1996 | Schmidt | 475/5 |
| 5,558,589 | * 9/1996 | Schmidt | 475/5 |
| 5,558,595 | * 9/1996 | Schmidt et al. | 477/3 |
| 5,562,566 | * 10/1996 | Yang | 477/3 |
| 5,643,119 | * 7/1997 | Yamaguchi et al. | 475/5 |
| 5,735,770 | * 4/1998 | Omote et al. | 477/5 |

FOREIGN PATENT DOCUMENTS

| | | |
|---|---|---|
| 4124479 A1 | 1/1993 | (DE) . |
| 195 32 128 A1 | 3/1997 | (DE) . |
| 0 725 474 A1 | 8/1996 | (EP) . |
| 0 743 211 A2 | 11/1996 | (EP) . |
| 0 743 216 A2 | 11/1996 | (EP) . |
| 0 830 969 A2 | 3/1998 | (EP) . |
| A 50-30223 | 3/1975 | (JP) . |
| A 6-144020 | 5/1994 | (JP) . |
| 8-126115 | 5/1996 | (JP) . |
| A-8-295140 | 11/1996 | (JP) . |

* cited by examiner

*Primary Examiner*—Elvin Enad
(74) *Attorney, Agent, or Firm*—Oliff & Berridge, PLC

(57) ABSTRACT

A power output apparatus includes a planetary gear having a planetary carrier, a sun gear, and a ring gear, an engine having a crankshaft linked with the planetary carrier, a first motor attached to the sun gear, and a second motor attached to the ring gear. In response to an engine operation stop instruction, the power output apparatus stops a fuel injection into the engine and controls the first motor, in order to enable a torque acting in reverse of the rotation of the crankshaft to be output to the crankshaft via the planetary gear and a carrier shaft until the revolving speed of the engine becomes close to zero. This structure allows the revolving speed of the engine to quickly approach zero.

22 Claims, 25 Drawing Sheets

[Fig.1]
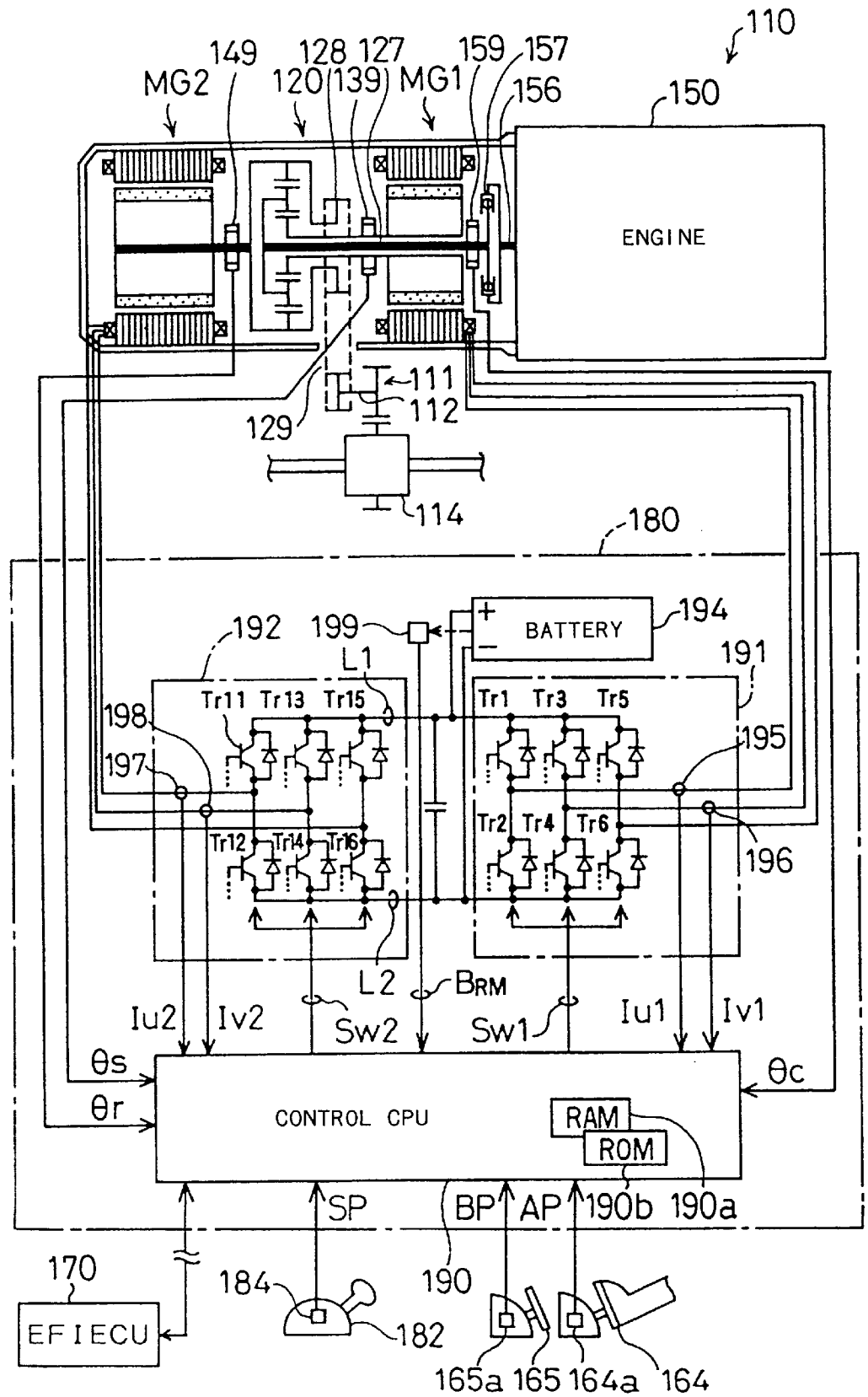

[Fig.2]
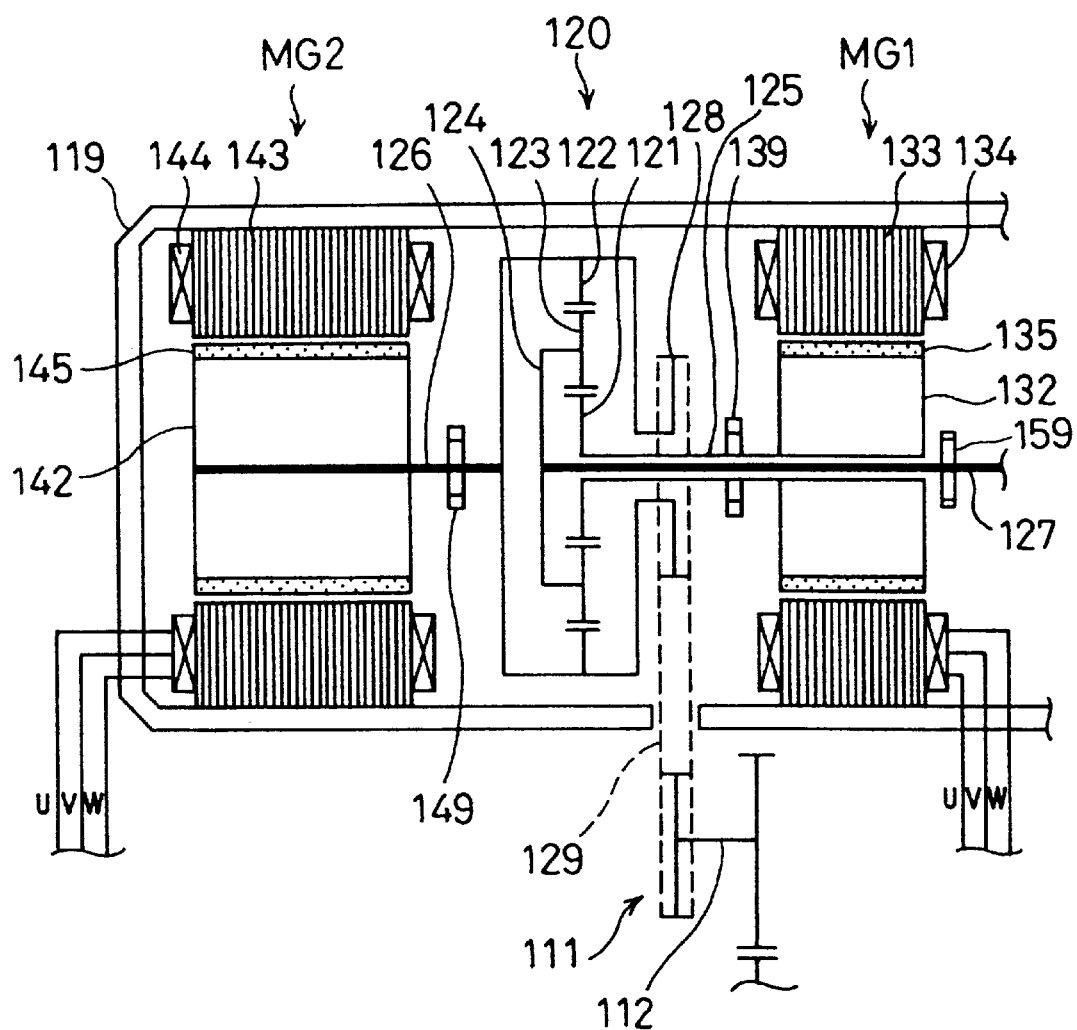

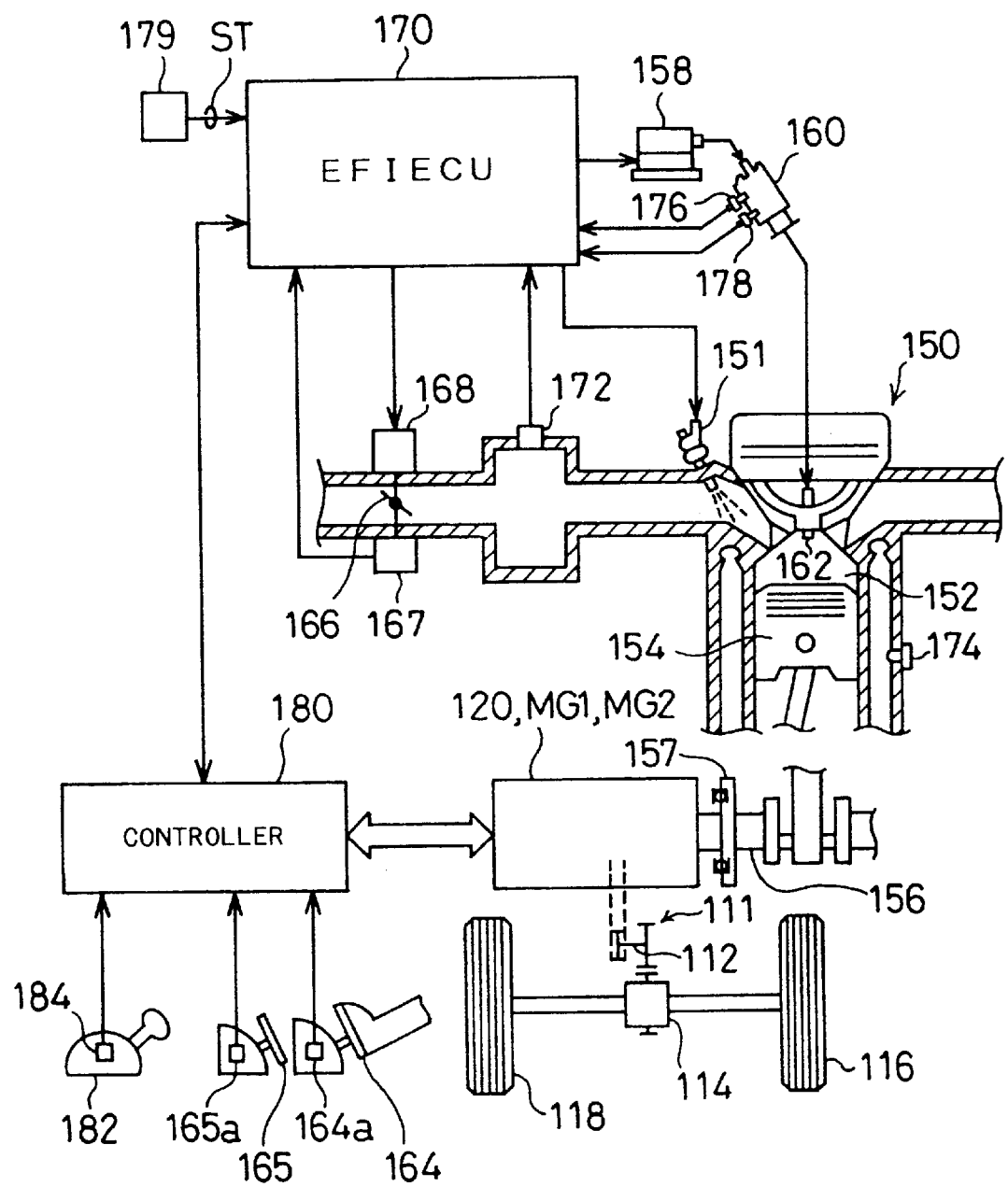
[Fig.3]

[Fig.4]
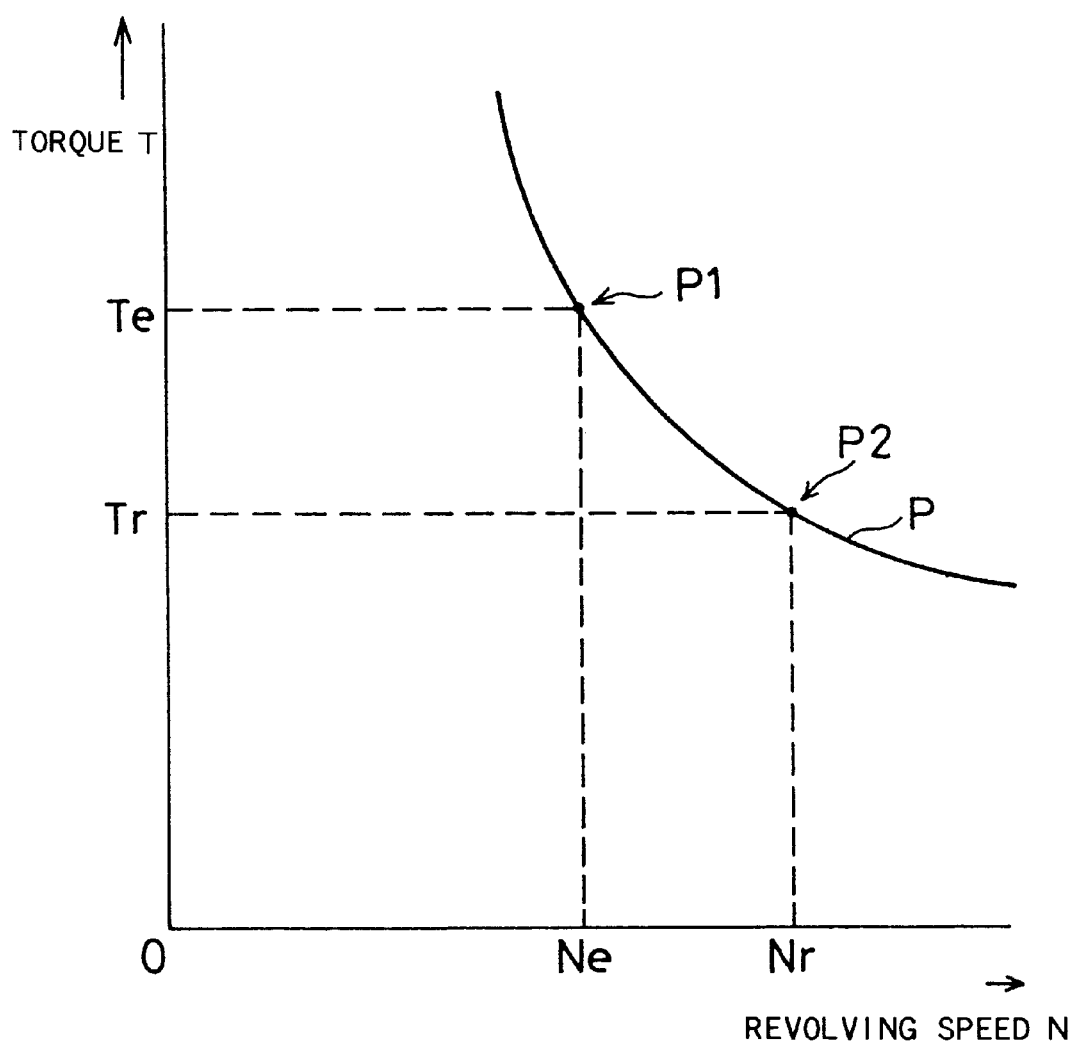

[Fig.5]
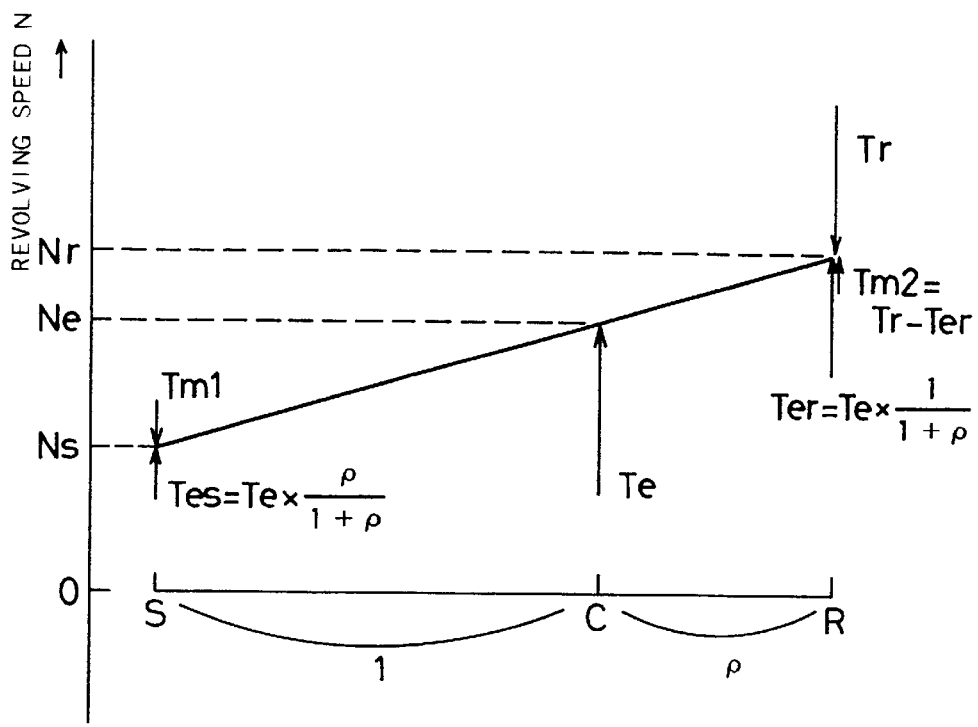
[Fig.6]
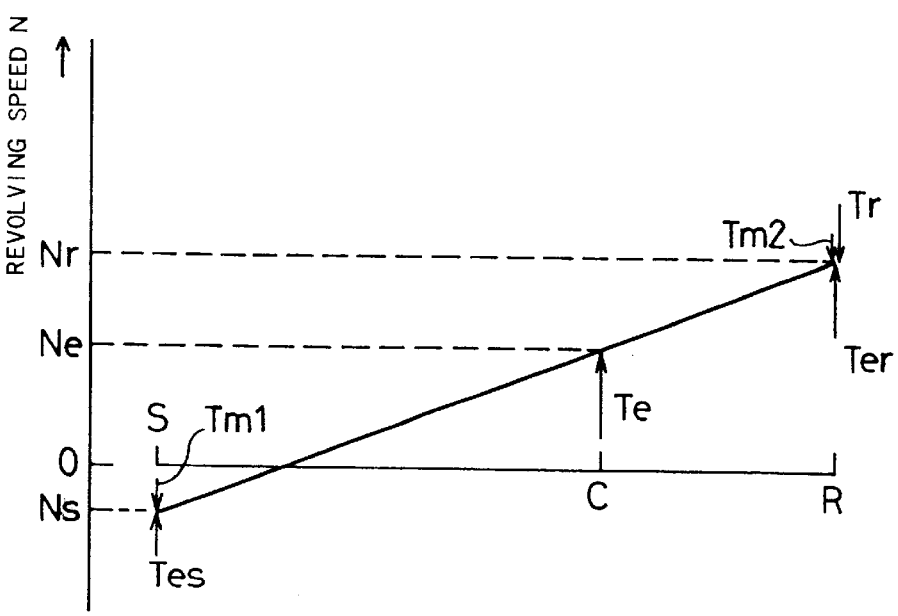

[Fig.7]
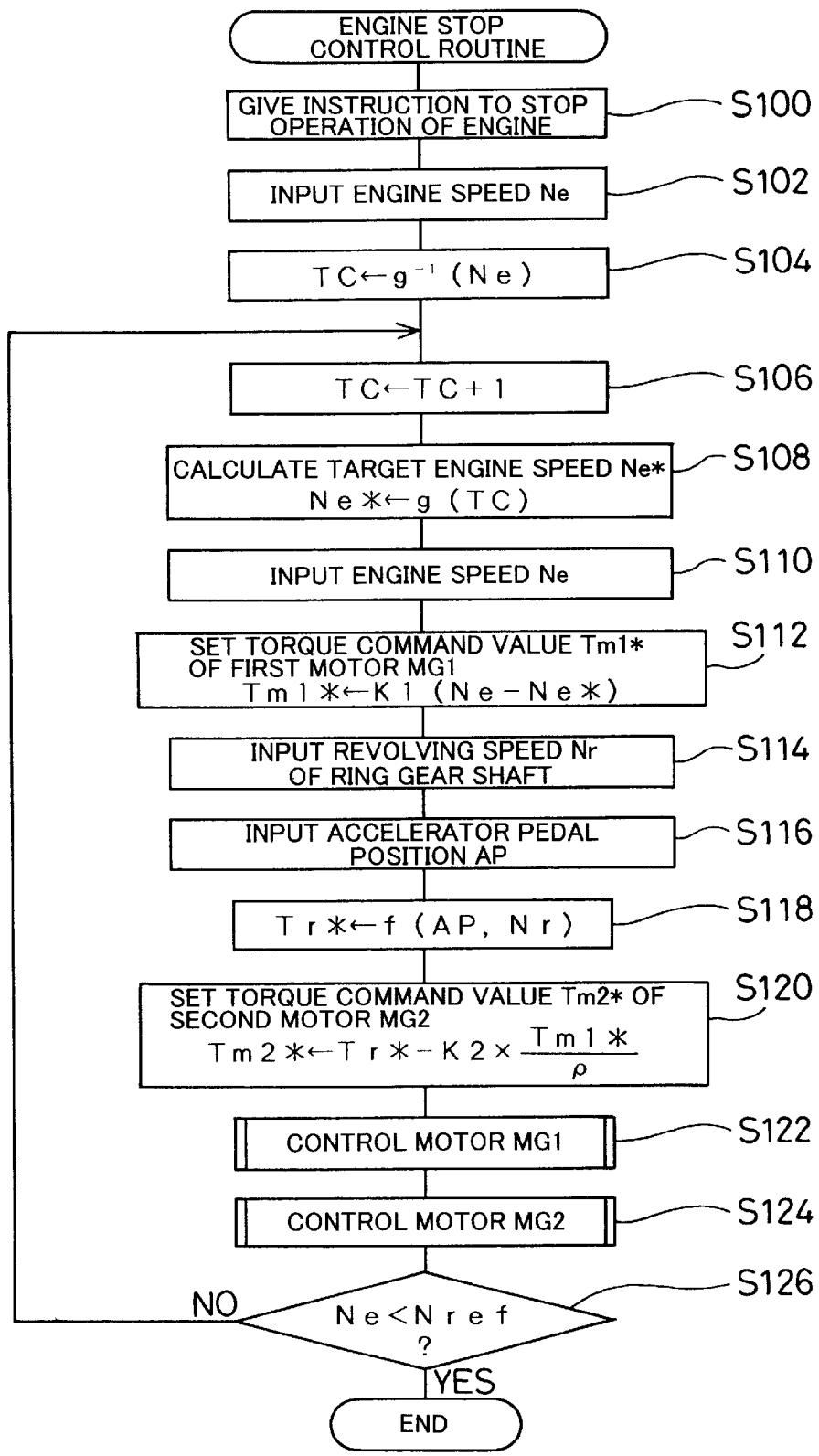

[Fig.8]
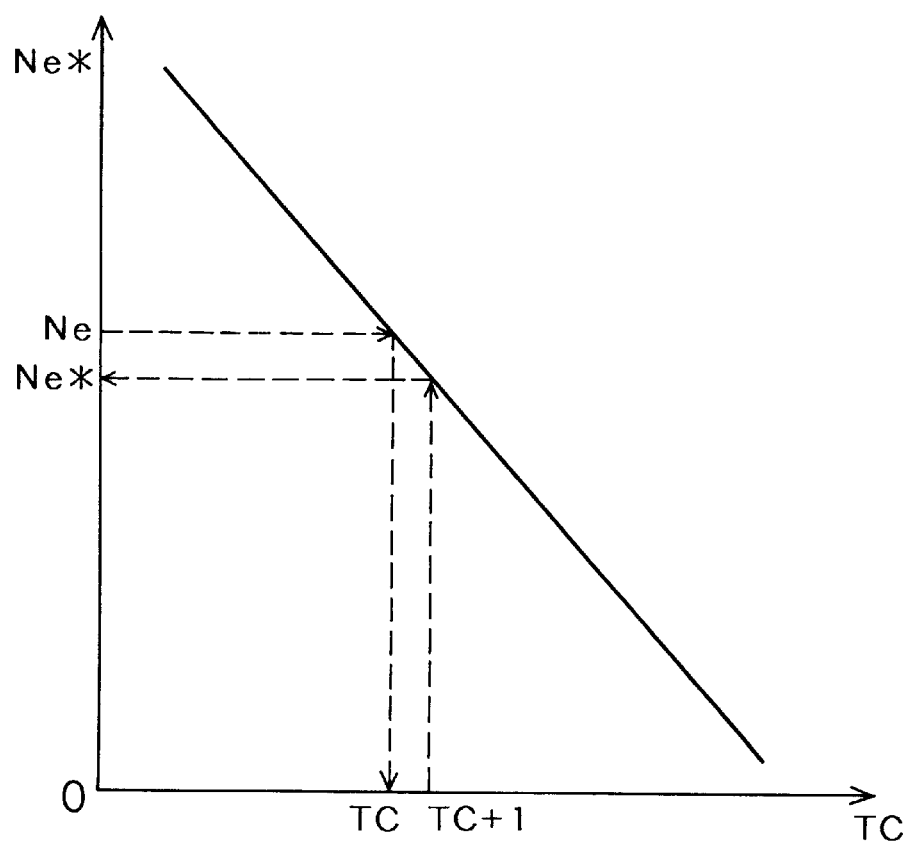

[Fig.9]
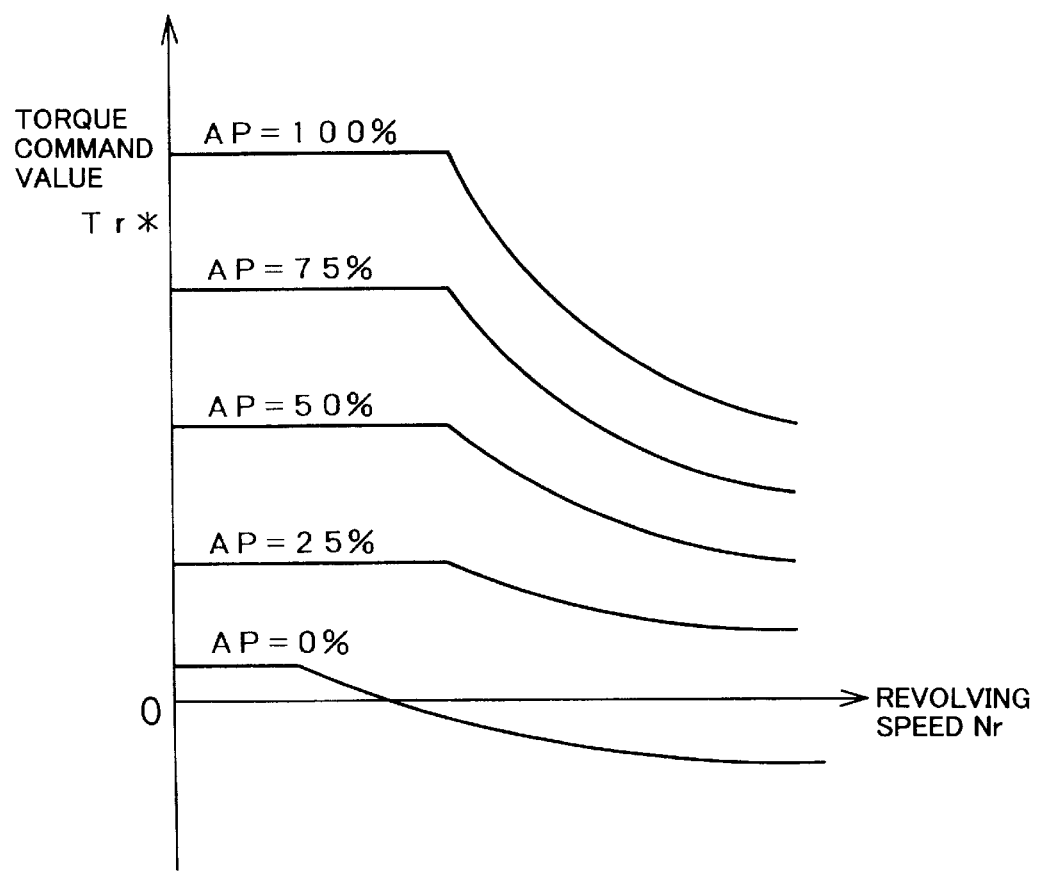

[Fig.10]
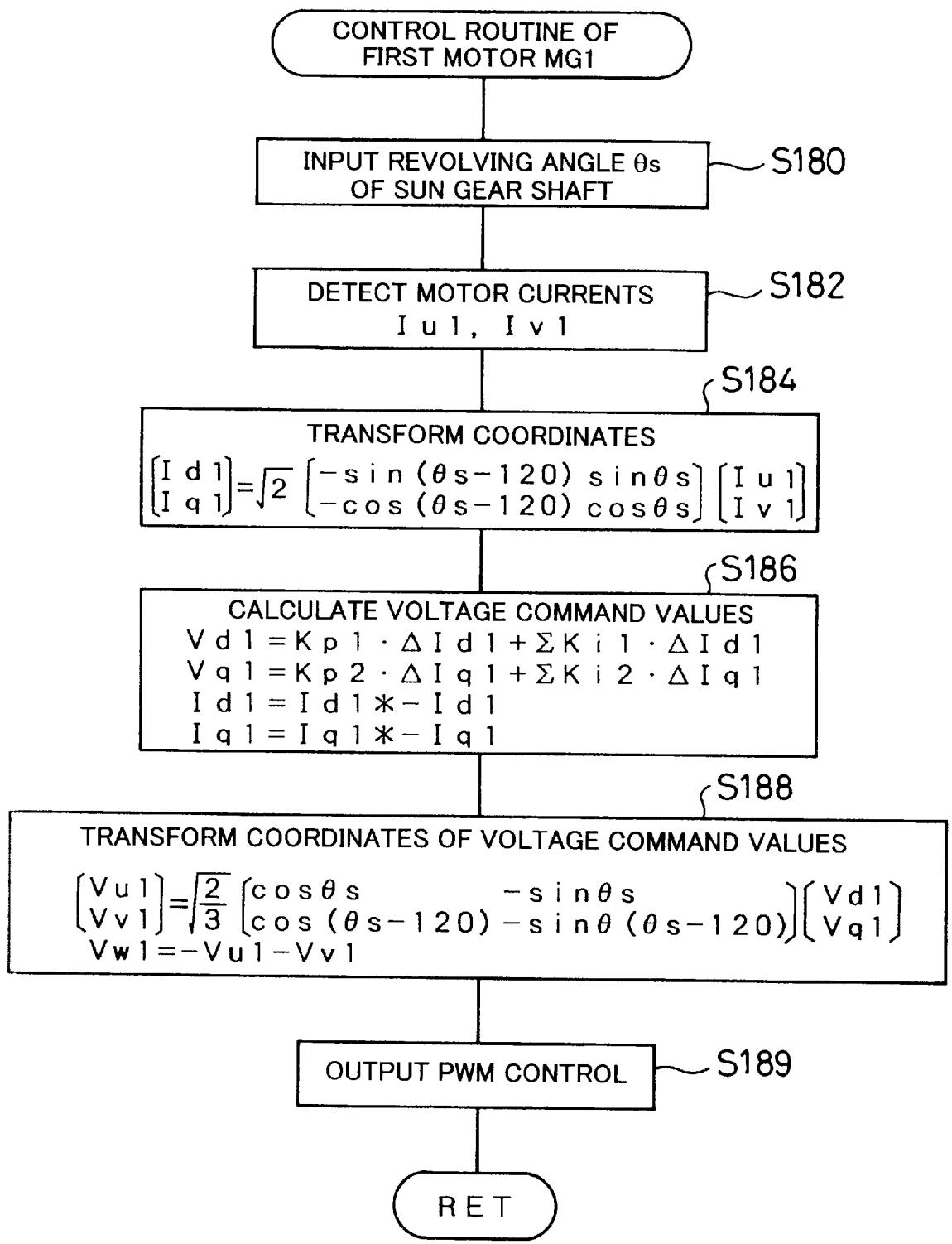

[Fig.11]
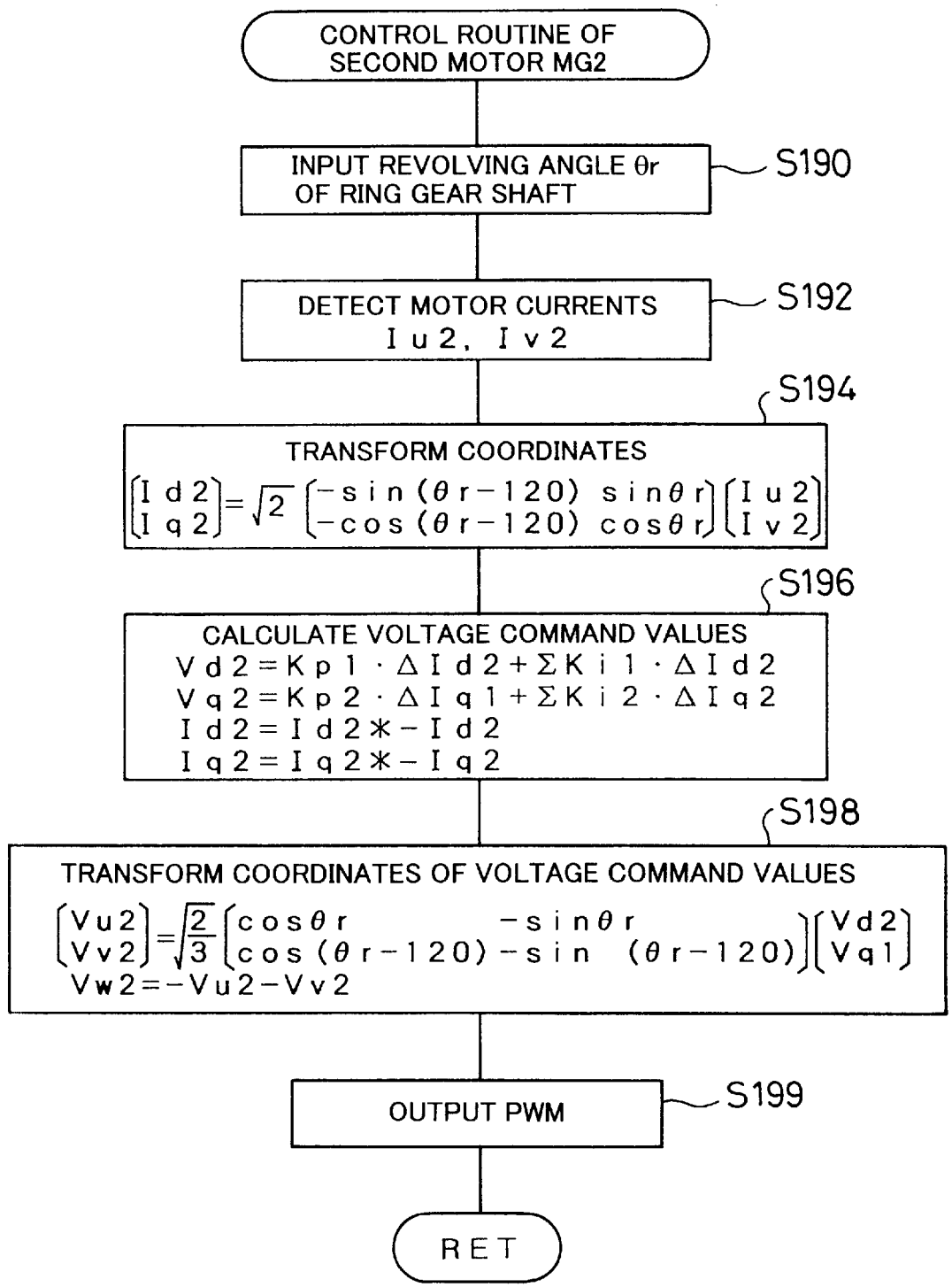

[Fig.12]
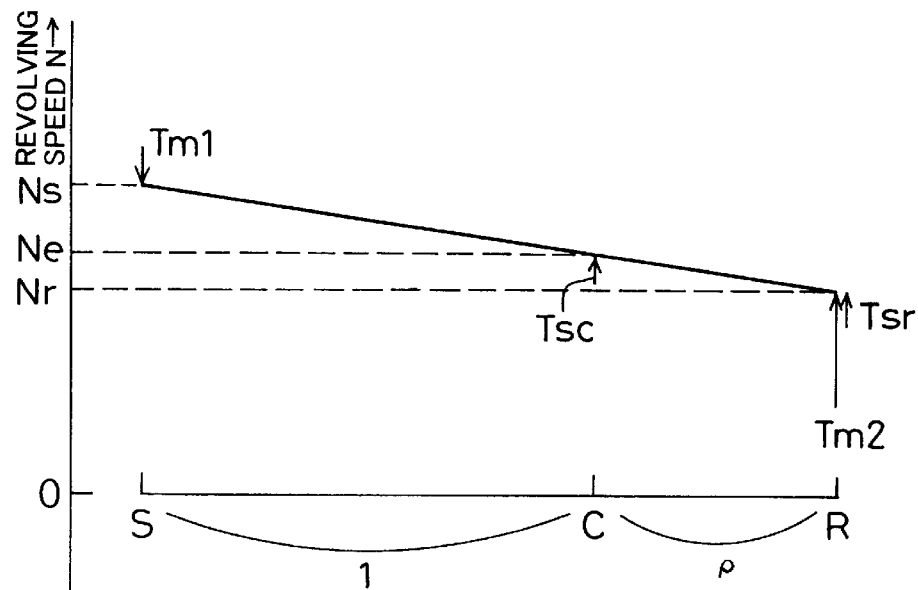
[Fig.13]
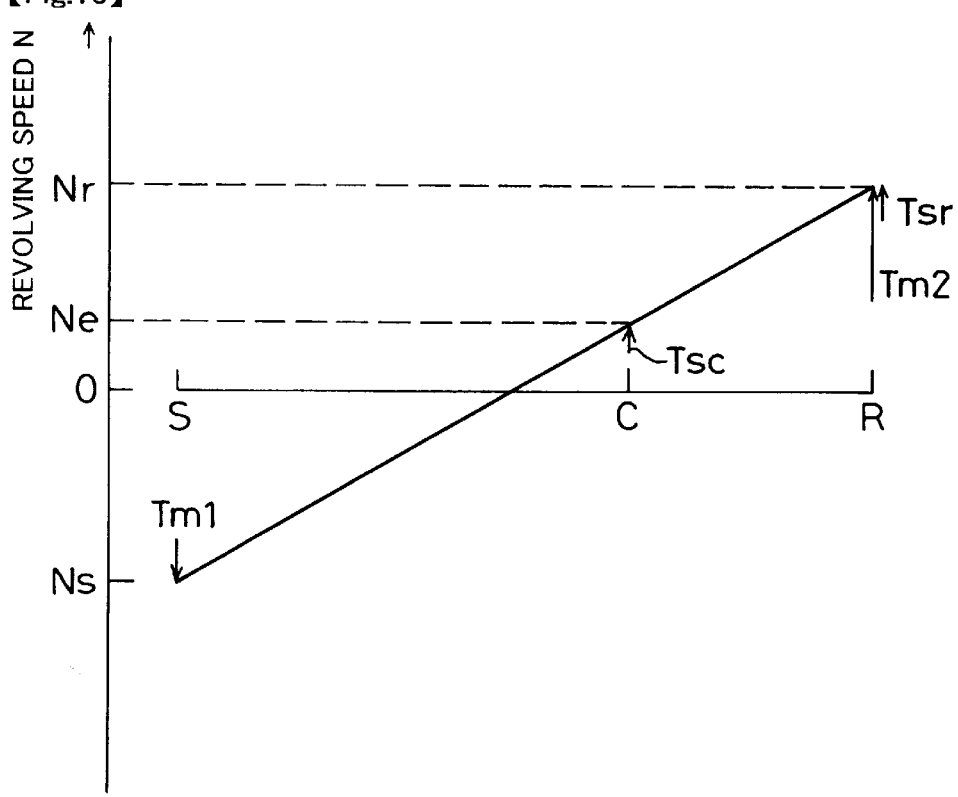

[Fig.14]
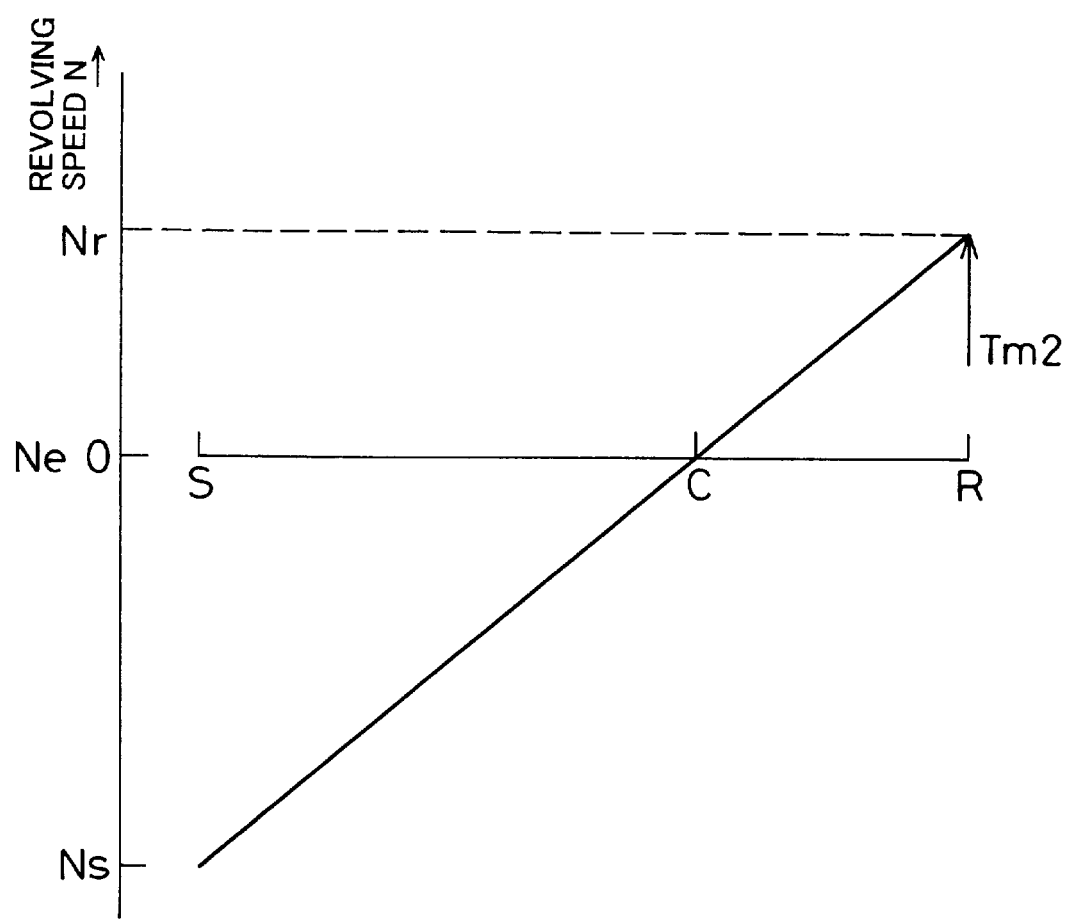

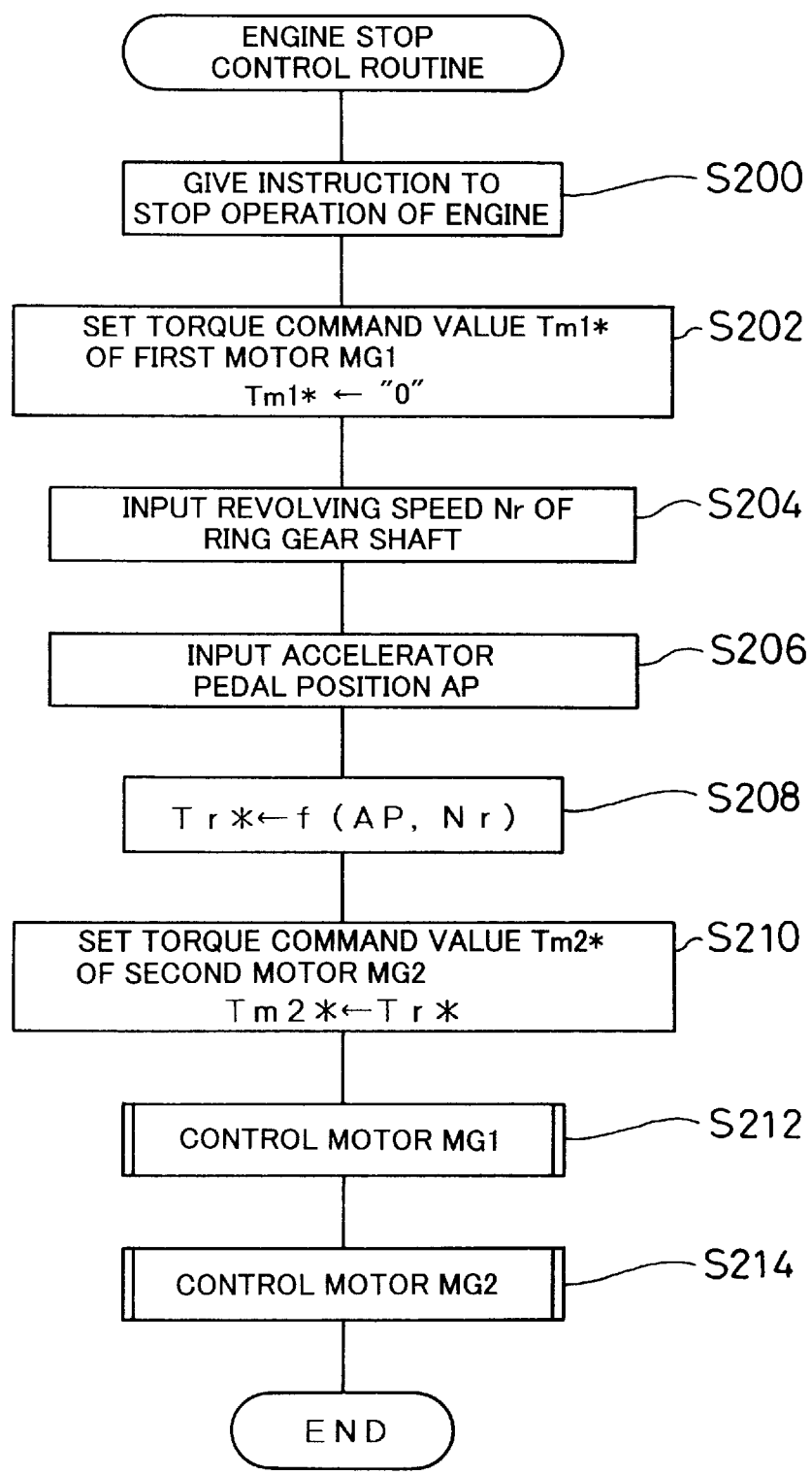
[Fig.15]

[Fig.16]
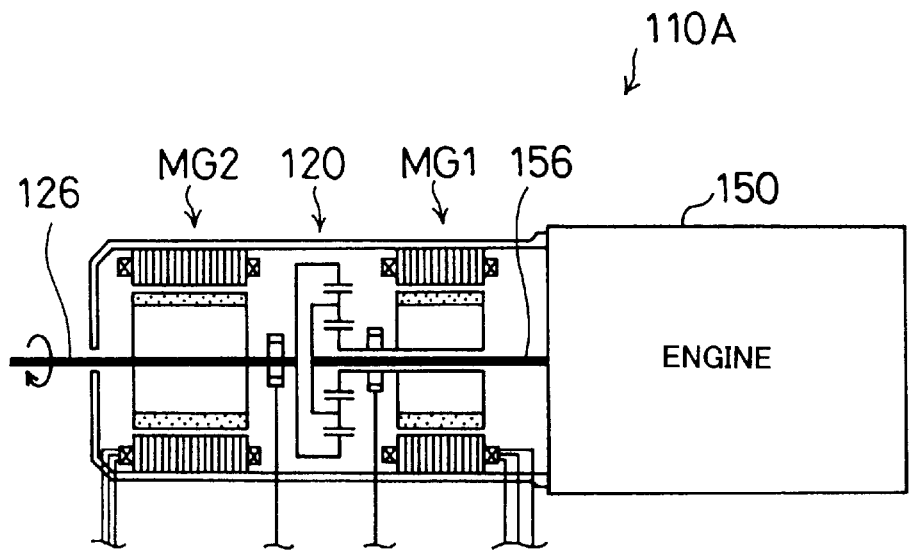
[Fig.17]
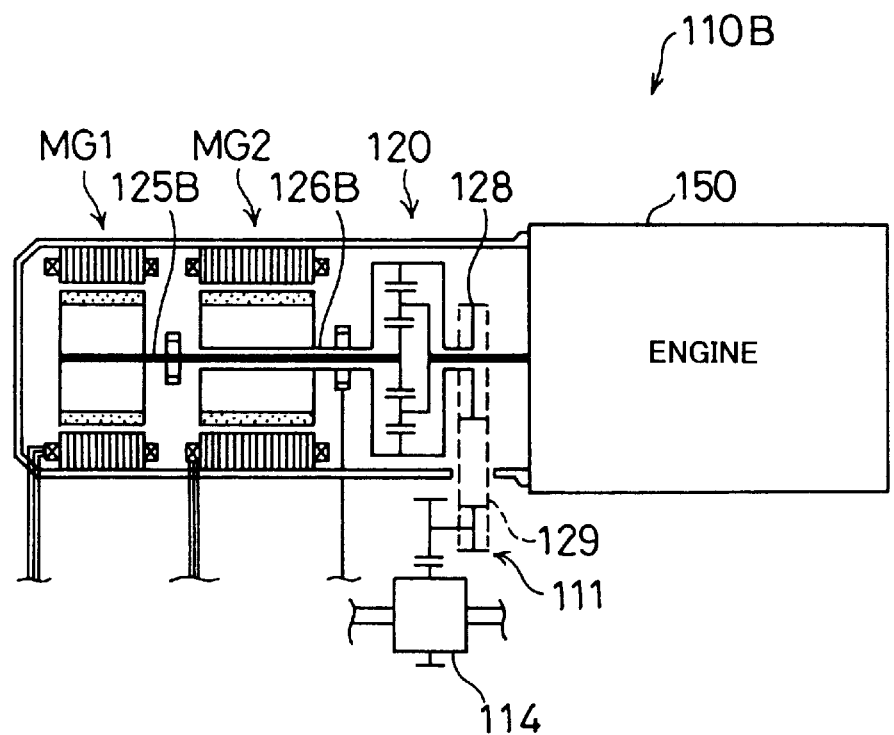

[Fig.18]
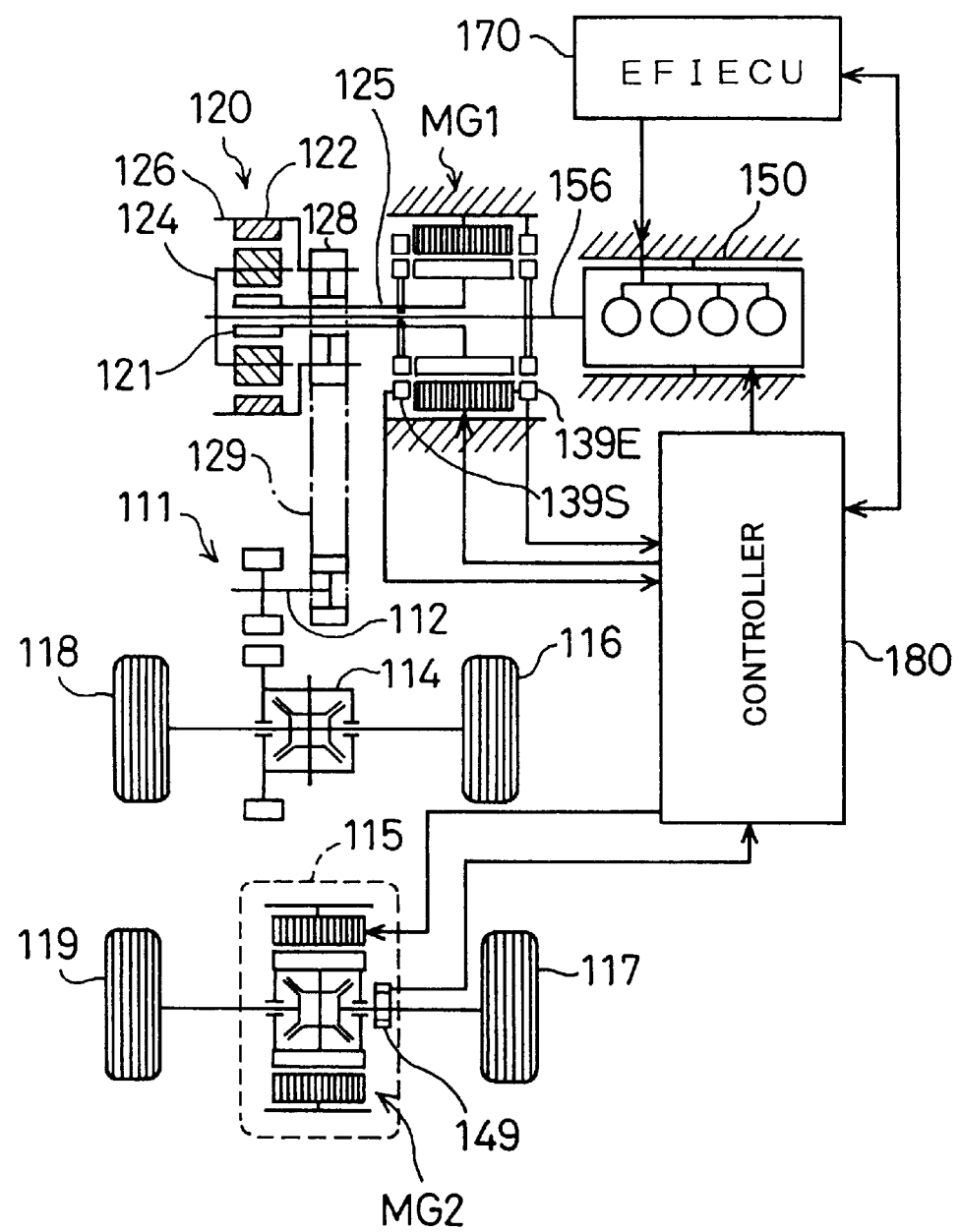

[Fig.19]
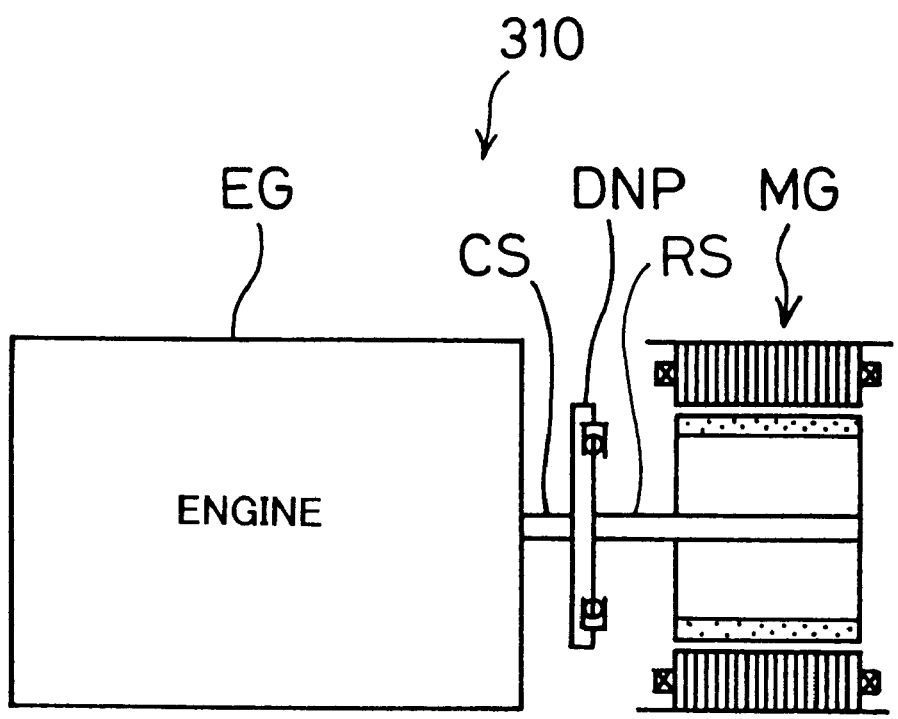

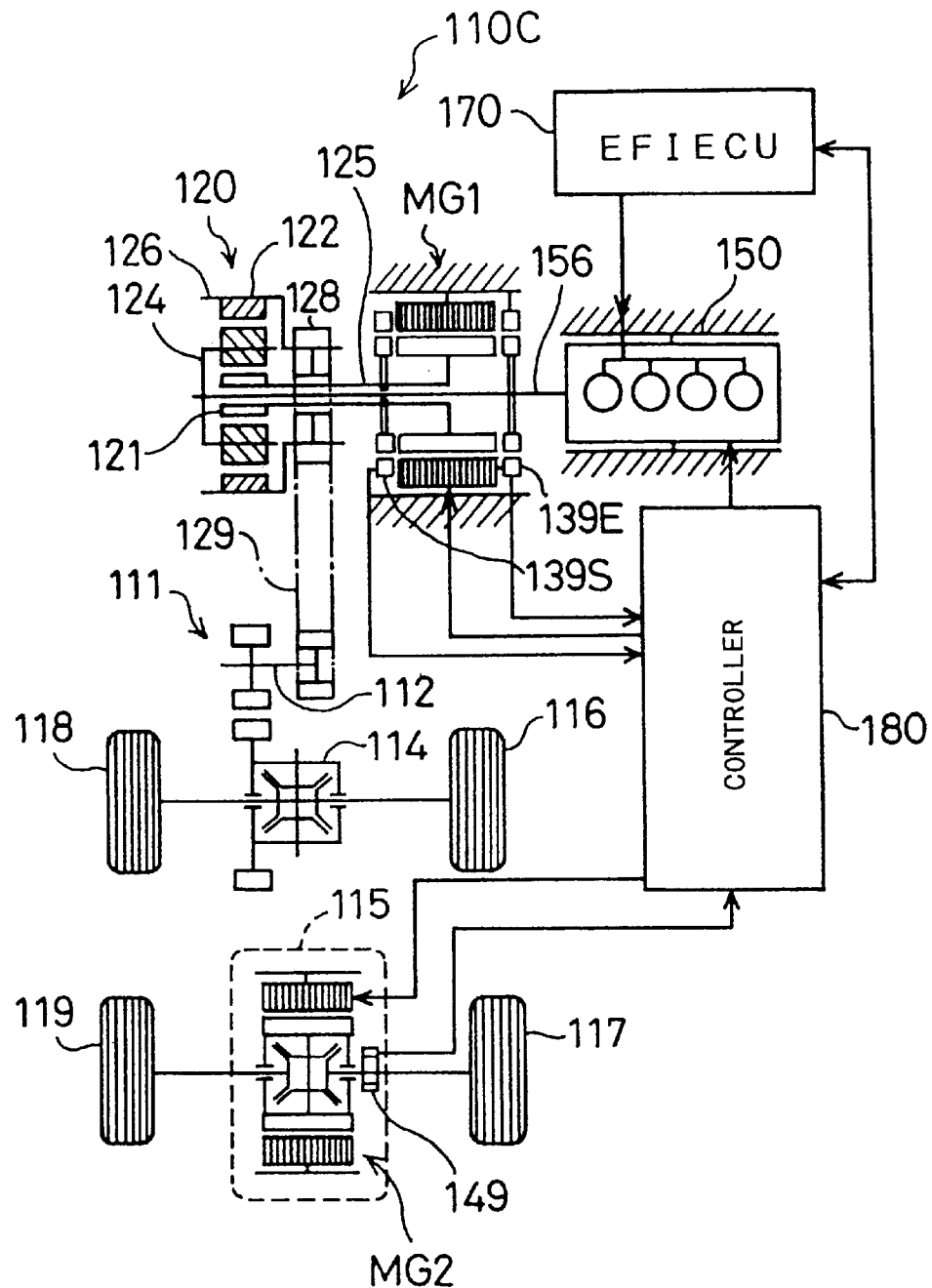
[Fig.20]

[Fig.21]
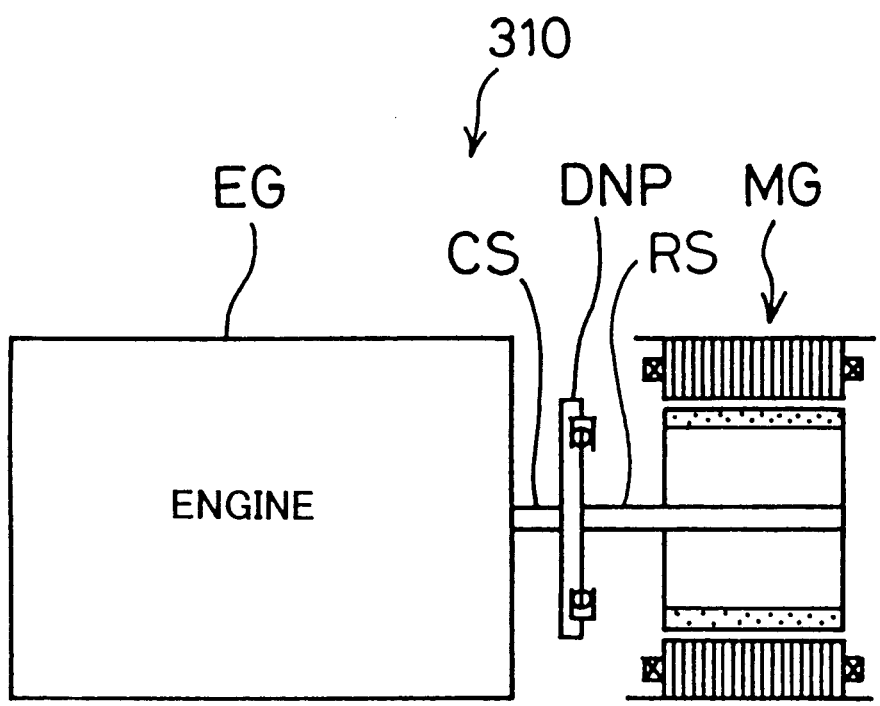

POWER OUTPUT APPARATUS, ENGINE CONTROLLER, AND METHODS OF CONTROLLING POWER OUTPUT APPARATUS AND ENGINE

FIELD OF THE INVENTION

The present invention relates to an engine controller, a power output apparatus, and methods of controlling an engine and the power output apparatus. More specifically the present invention pertains to a technique of stopping the operation of an engine in a system including the engine for outputting power through combustion of a fuel and a motor connected to an output shaft of the engine via a damper as well as to a technique of stopping the operation of an engine in a power output apparatus for outputting power to a drive shaft.

DESCRIPTION OF THE RELATED ART

Known power output apparatuses for carrying out torque conversion of power output from an engine and outputting the converted power to a drive shaft include a combination of a fluid-based torque converter with a transmission. In such a power output apparatus, the torque converter is disposed between an output shaft of the engine and a rotating shaft linked with the transmission, and transmits the power between the rotating shaft and the output shaft through a flow of the sealed fluid. Since the torque converter transmits the power through a flow of the fluid, there is a slip between the output shaft and the rotating shaft, which leads to an energy loss corresponding to the slip. The energy loss is expressed as the product of the revolving speed difference between the rotating shaft and the output shaft and the torque transmitted to the output shaft, and is consumed as heat.

In a vehicle with such a power output apparatus mounted thereon as its power source, at the time when there is a large slip between the rotating shaft and the output shaft, that is, when a significantly large power is required, for example, at the time of starting the vehicle or running the vehicle on an upward slope at a low speed, a large energy loss in the torque converter undesirably lowers the energy efficiency. Even in a stationary driving state, the efficiency of power transmission by the torque converter is not 100%, and the fuel consumption rate in the conventional power output apparatus is thereby lower than that in a manual transmission.

In order to solve such problems, the applicants have proposed a system that does not include the fluid-based torque converter but has an engine, a planetary gear unit as three shaft-type power input/output means, a generator, a motor, and a battery and outputs the power from the motor to the drive shaft by utilizing the power output from the engine or electric power stored in the battery (JAPANESE PATENT LAYING-OPEN GAZETTE No. 50-30223). In this reference, however, there is no description of the control procedure when the operation of the engine is stopped.

In this power output apparatus, the output shaft of the engine and the rotating shaft of the motor are mechanically linked with each other by the three shaft-type power input/output means, and thus mechanically constitute one vibrating system. When the engine is an internal combustion engine, for example, a torque variation due to a gas explosion or reciprocating motions of the piston in the internal combustion engine causes torsional vibrations on the output shaft of the internal combustion engine and the rotating shaft of the motor. When the natural frequency of the shaft coincides with the forcible frequency, a resonance occurs. This may result in a foreign noise from the three shaft-type power input/output means and even in a fatigue destruction of the shaft in some cases. Such a resonance occurs in many cases at a revolving speed lower than the minimum of an operable revolving speed range of the engine, although it depends upon the type of the engine and the structure of the three shaft-type power input/output means.

The resonance of the torsional vibrations that may occur in the system at the time of stopping the operation of the engine is observed not only in the power output apparatus but in any driving system, wherein the output shaft of the engine and the rotating shaft of the motor are mechanically linked with each other. The primary countermeasure against these troubles is that the output shaft of the engine and the rotating shaft of the motor are mechanically linked with each other via a damper. The dampers having a significant effect on reduction of the amplitude of the torsional vibrations, however, require a special damping mechanism. This increases the required number of parts and makes the damper undesirably bulky. The small-sized simply-structured dampers, on the other hand, have little effects.

The motor is generally under the PI control. In the procedure of outputting a torque from the motor to the output shaft of the engine and thereby positively stopping the operation of the engine, the I term (integral term) may result in undershooting the output shaft of the engine, which causes a vibration of the whole driving system. When the driving system is mounted, for example, on a vehicle, the vibration due to undershooting is transmitted to the vehicle body and makes the driver uncomfortable.

SUMMARY OF THE INVENTION

One object of the present invention is to provide a power output apparatus for outputting power from an engine to a drive shaft with a high efficiency, as well as a method of controlling such a power output apparatus.

Another object of the present invention is to provide a control technique of stopping the operation of an engine in a power output apparatus, which includes the engine, three shaft-type power input/output means, and two motors.

Still another object of the invention is to provide a power output apparatus which can prevent a resonance of torsional vibrations that may occur in the system when the operation of the engine is stopped, as well as to provide a method of controlling such a power output apparatus.

In the process of applying a torque from the motor to the output shaft of the engine to stop the operation of the engine, the control procedure of the motor may cause the revolving speed of the output shaft of the engine to undershoot and become smaller than zero. This may result in undesirable vibrations of the whole power output apparatus. In case that the power output apparatus is mounted on a vehicle, for example, the vibrations due to the undershoot are transmitted to the vehicle body and makes the driver uncomfortable.

This problem, that is, the resonance of torsional vibrations that may occur in the system in the course of stopping the operation of the engine, is not restricted to the power output apparatus, but arises in any driving system wherein the output shaft of the engine and the rotating shaft of the motor are mechanically connected to each other. The primary countermeasure against this problem is that the output shaft of the engine and the rotating shaft of the motor are mechanically linked with each other via a damper. The dampers having a significant effect on reduction of the amplitude of the torsional vibrations, however, require a special damping mechanism. This increases the required number of parts and makes the damper undesirably bulky.

The small-sized simply-structured dampers, on the other hand, have little effects.

This problem is found not only in the structure that directly outputs power but in the structure of series hybrid that has a motor and a generator directly connected to each other and obtains a torque by the motor driven by means of the electric power generated by the generator while the vehicle is on a run.

A further object of the present invention is thus to provide a power output apparatus that prevents resonance of torsional vibrations which may occur in a system in the course of stopping the operation of an engine, as well as a method of controlling such a power output apparatus.

Another object of the present invention is accordingly to reduce vibrations that may occur in the course of stopping the operation of an engine.

Still another object of the present invention is thus to provide an engine controller that prevents resonance of torsional vibrations which may occur in a system in the course of stopping the operation of an engine, irrespective of the type of a damper, as well as a method of controlling the engine.

At least part of the above and the other related objects is realized by a power output apparatus for outputting power to a drive shaft, which includes: an engine having an output shaft; a first motor having a rotating shaft and inputting and outputting power to and from the rotating shaft; a second motor inputting and outputting power to and from the drive shaft; three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts; fuel stop instruction means for giving an instruction to stop fuel supply to the engine when a condition of stopping operation of the engine is fulfilled; and stop-time control means for causing a torque to be applied to the output shaft of the engine and thereby restricting a deceleration of revolving speed of the output shaft to a predetermined range in response to the instruction to stop the fuel supply to the engine, so as to implement a stop-time control for stopping the operation of the engine.

The present invention is also directed to a method of controlling such a power output apparatus. The method controls the power output apparatus, which includes: an engine having an output shaft; a first motor having a rotating shaft and inputting and outputting power to and from the rotating shaft; a second motor inputting and outputting power to and from the drive shaft; and three shaft-type power input/output means having three shafts respectively linked with the drive shaft, the output shaft, and the rotating shaft, the three shaft-type power input/output means inputting and outputting power to and from a residual one shaft, based on predetermined powers input to and output from any two shafts among the three shafts. The method includes the steps of:

giving an instruction to stop fuel supply to the engine when a condition of stopping operation of the engine is fulfilled; and causing a torque to be applied to the output shaft of the engine and thereby restricting a deceleration of revolving speed of the output shaft to a predetermined range in response to the instruction to stop the fuel supply to the engine, so as to implement a stop-time control for stopping the operation of the engine.

When the condition to stop the operation of the engine is fulfilled, the power output apparatus of the present invention gives an instruction to stop fuel supply to the engine and carries out the stop-time control. The stop-time control applies a torque to the output shaft of the engine and thereby restricts the deceleration of the revolving speed of the output shaft to a predetermined range, so as to stop the operation of the engine. The torque may be applied from either the first motor or the second motor to the output shaft of the engine.

This procedure restricts the deceleration of the revolving speed of the output shaft to a predetermined range and enables the revolving speed of the output shaft to quickly pass through a range of torsional vibrations. This structure also saves the consumption of electric power by the motor.

A variety of structures may be applied to the stop-time control. One available structure carries out open-loop control of the torque applied to the output shaft. In this case, the power output apparatus further includes target torque storage means for determining a time-based variation in target value of the torque applied to the output shaft of the engine, based on a behavior at the time of stopping the operation of the engine. The stop-time control means has means for driving the first motor, as the stop-time control, to apply a torque corresponding to the target value to the output shaft of the engine along a time course after the stop of the engine via the three shaft-type power input/output means.

This structure does not carry out the feedback control based on the revolving speed of the output shaft and accordingly reduces the variation in torque on the drive shaft without causing a variation in torque due to the state of the power output apparatus or an external disturbance. Even when the revolving speed of the output shaft is significantly different from a target revolving speed (generally equal to zero under the condition of the vehicle at a stop), this structure does not execute the feedback control based on the revolving speed difference to output a large torque and thus effectively saves the consumption of electric power.

In order to optimize such open-loop control, the power output apparatus may further include: deceleration computing means for computing the deceleration of revolving speed of the output shaft during the course of the stop-time control; learning means for varying a learnt value according to the deceleration computed by the deceleration computing means and storing the learnt value; and deceleration range determination means for determining the predetermined range in the stop-time control carried out by the stop-time control means, based on the learnt value stored by the learning means. This structure learns the range of deceleration and thereby realizes the preferable control.

In accordance with another possible application, the power output apparatus further includes revolving speed detection means for measuring the revolving speed of the output shaft, and the stop-time control means has means for driving the first motor, as the stop-time control, in order to enable the revolving speed of the output shaft measured by the revolving speed detection means to approach a predetermined value via a predetermined pathway. The predetermined pathway represents a time course of revolving speed of the output shaft of the engine after the stop of fuel supply to the engine.

In response to the instruction to stop the operation of the engine, the power output apparatus of this structure enables the revolving speed of the output shaft of the engine to approach a predetermined value via a predetermined pathway. The revolving speed of the output shaft of the engine can be made to reach the predetermined value within a short time or within a relatively long time by regulating the predetermined pathway. In case that the predetermined value is equal to zero, the rotation of the output shaft of the engine can be stopped quickly or gently.

In the power output apparatus of this structure, the stop-time control may drive the first motor to apply a torque in reverse of the rotation of the output shaft via the three shaft-type power input/output means to the output shaft, until the revolving speed of the output shaft measured by the revolving speed detection means becomes coincident with the predetermined value. This structure enables the revolving speed of the output shaft of the engine to approach the predetermined value more quickly. When a specific revolving speed range that causes a resonance of a torsional vibration exists between the predetermined value and the revolving speed of the output shaft of the engine at the time when the instruction to stop the operation of the engine is given, the structure allows the revolving speed of the output shaft of the engine to swiftly pass through this specific range and thereby effectively prevents a resonance.

In the power output apparatus of this structure, as part of the stop-time control, the first motor may be driven to apply a predetermined torque in the direction of rotation of the output shaft via the three shaft-type power input/output means to the output shaft, when the revolving speed of the output shaft measured by the revolving speed detection means decreases to a reference value, which is not greater than the predetermined value. This structure prevents the revolving speed of the engine from undershooting and reduces the possible vibration in the course of stopping the rotation of the output shaft.

A variety of techniques may be applied to determine the reference value. One possible structure computes the deceleration of revolving speed of the output shaft during the course of the stop-time control, and sets a larger value to the reference value against a greater absolute value of the deceleration. The larger reference value for the greater deceleration effectively prevents the revolving speed of the output shaft from undershooting. Another possible structure determines the magnitude of a braking force applied to the drive shaft during the course of the stop-time control, and sets a larger value to the reference value when the braking force detection means determines that the braking force has a large magnitude. During application of the braking force, it can be assumed that a large force is applied to stop the engine. The larger reference value accordingly prevents the revolving speed of the output shaft from undershooting.

In the power output apparatus of the present invention, the stop-time control means may drive the first motor to make the power input to and output from the rotating shaft equal to zero. The first motor does not consume any electric power, so that this structure improves the energy efficiency of the whole power output apparatus. Since the first motor does not forcibly change the driving state of the output shaft of the engine, the torque shock due to an operation stop of the engine can be effectively reduced. The engine and the first motor are stably kept in the driving state having the least sum of the energies consumed thereby (for example, the frictional work).

In the power output apparatus of the present invention, the predetermined value may be a revolving speed that is lower than a resonance range of torsional vibrations in a system including the output shaft and the three shaft-type power input/output means. This structure effectively prevents torsional vibrations.

In accordance with another preferable structure, the second motor is driven to continue power input and output to and from the drive shaft, when the instruction to stop the operation of the engine is given in the course of continuous power input and output to and from the drive shaft. This structure enables the operation of the engine to be stopped while the power is continuously input to and output from the drive shaft. The input and output of the power to and from the drive shaft is implemented by the second motor.

The present invention is also directed to an engine controller having an engine for outputting power through combustion of a fuel and a motor connected to an output shaft of the engine via a damper. The engine controller controls operation and stop of the engine and includes: fuel stop means for stopping fuel supply to the engine when a condition to stop the operation of the engine is fulfilled; and stop-time control means for causing a torque to be applied to the output shaft of the engine and thereby restricting a deceleration of revolving speed of the output shaft to a predetermined range in response to the stop of fuel supply to the engine, so as to implement a stop-time control for stopping the operation of the engine.

The present invention is further directed to a method of controlling stop of an engine, which outputs power through combustion of a fuel and has an output shaft connected to a motor via a damper. The method includes the steps of:

stopping fuel supply to the engine when a condition to stop operation of the engine is fulfilled; and causing a torque to be applied to the output shaft of the engine and thereby restricting a deceleration of revolving speed of the output shaft to a predetermined range in response to the stop of fuel supply to the engine, so as to implement a stop-time control for stopping the operation of the engine.

The engine controller and the corresponding method of the present invention controls stop of the engine that has an output shaft connected to a motor via a damper, and reduces the torsional vibrations that may occur on the output shaft of the engine connected to the motor via the damper. When the condition to stop the operation of the engine is fulfilled, the engine controller stops the fuel supply to the engine and applies a torque to the output shaft of the engine, thereby restricting the deceleration of the revolving speed of the output shaft to a predetermined range and stopping the operation of the engine. The torsional vibrations on the output shaft tend to occur at a predetermined deceleration. The restriction of the deceleration of the revolving speed of the output shaft to the predetermined range thus effectively reduces the torsional vibrations.

A variety of structures maybe applied to the stop-time control that restricts the deceleration of the revolving speed of the output shaft to a predetermined range. One available structure carries out open-loop control that specifies a variation in target value of the torque applied to the output shaft along the time axis. In this case, the engine controller further includes target torque storage means for determining a time-based variation in target value of the torque applied to the output shaft of the engine, based on a behavior at the time of stopping the operation of the engine. The stop-time control means has means for driving the motor, as the stop-time control, to apply a torque corresponding to the target value to the output shaft of the engine along a time course after the stop of the engine.

This structure does not carry out the feedback control based on the revolving speed of the output shaft and accordingly does not vary the torque applied to the output shaft by an external disturbance. Even when the revolving speed of the output shaft is significantly different from a target revolving speed (generally equal to zero under the condition of the vehicle at a stop), this structure does not execute the feedback control based on the revolving speed difference to output a large torque and thus effectively saves the consumption of electric power.

In order to optimize such open-loop control, the engine controller may further include: deceleration computing means for computing the deceleration of revolving speed of the output shaft during the course of the stop-time control; learning means for varying a learnt value according to the deceleration computed by the deceleration computing means and storing the learnt value; and deceleration range determination means for determining the predetermined range in the stop-time control carried out by the stop-time control means, based on the learnt value stored by the learning means. This structure learns the range of deceleration and thereby realizes the preferable control.

In accordance with another possible application, the engine controller further includes revolving speed detection means for measuring the revolving speed of the output shaft, and the stop-time control means has means for driving the motor, as the stop-time control, in order to enable the revolving speed of the output shaft measured by the revolving speed detection means to approach a predetermined value via a predetermined pathway. The predetermined pathway represents a time course of revolving speed of the output shaft of the engine after the stop of fuel supply to the engine.

In response to the instruction to stop the operation of the engine, the engine controller of this structure enables the revolving speed of the output shaft of the engine to approach a predetermined value via a predetermined pathway. The revolving speed of the output shaft of the engine can be made to reach the predetermined value within a short time or within a relatively long time by regulating the predetermined pathway. In any case, the deceleration is restricted to a predetermined range that is out of a specific range causing torsional vibrations on the output shaft.

In the engine controller of this structure, the stop-time control may drive the motor to apply a torque in reverse of the rotation of the output shaft to the output shaft, until the revolving speed of the output shaft measured by the revolving speed detection means becomes coincident with the predetermined value. This structure enables the revolving speed of the output shaft of the engine to approach the predetermined value more quickly. When a specific revolving speed range that causes a resonance of a torsional vibration exists between the predetermined value and the revolving speed of the output shaft of the engine at the time when the instruction to stop the operation of the engine is given, the structure allows the revolving speed of the output shaft of the engine to swiftly pass through this specific range and thereby effectively prevents a resonance.

In the engine controller of this structure, as part of the stop-time control, the motor may be driven to apply a predetermined torque in the direction of rotation of the output shaft to the output shaft, when the revolving speed of the output shaft measured by the revolving speed detection means decreases to a reference value, which is not greater than the predetermined value. This structure prevents the revolving speed of the engine from undershooting and reduces the possible vibration in the course of stopping the rotation of the output shaft.

A variety of techniques may be applied to determine the reference value. One possible structure computes the deceleration of revolving speed of the output shaft during the course of the stop-time control, and sets a larger value to the reference value against a greater absolute value of the deceleration. The larger reference value for the greater deceleration effectively prevents the revolving speed of the output shaft from undershooting.

In the engine controller of the present invention, the predetermined value may be a revolving speed that is lower than a resonance range of torsional vibrations in a system including the output shaft and a rotor of the motor. This structure effectively prevents torsional vibrations.

BRIEF DESCRIPTION OF THE DRAWINGS

FIG. 1 schematically illustrates structure of a power output apparatus 110 embodying the present invention;

FIG. 2 is an enlarged view illustrating an essential part of the power output apparatus 110 of the embodiment;

FIG. 3 schematically illustrates general structure of a vehicle with the power output apparatus 110 of the embodiment incorporated therein;

FIG. 4 is a graph showing the operation principle of the power output apparatus 110 of the embodiment;

FIG. 5 is a nomogram showing the relationship between the revolving speed and the torque on the three shafts linked with the planetary gear 120 in the power output apparatus 110 of the embodiment;

FIG. 6 is a nomogram showing the relationship between the revolving speed and the torque on the three shafts linked with the planetary gear 120 in the power output apparatus 110 of the embodiment;

FIG. 7 is a flowchart showing an engine stop control routine executed by the control CPU 190 of the controller 180;

FIG. 8 is a map showing the relationship between the time counter TC and the target revolving speed Ne* of the engine 150;

FIG. 9 is a flowchart showing a required torque setting routine executed by the control CPU 190 of the controller 180;

FIG. 10 shows the relationship between the revolving speed Nr of the ring gear shaft 126, the accelerator pedal position AP, and the torque command value Tr*;

FIG. 11 is a flowchart showing a control routine of the first motor MG1 executed by the control CPU 190 of the controller 180;

FIG. 12 is a flowchart showing a control routine of the second motor MG2 executed by the control CPU 190 of the controller 180;

FIG. 13 is a nomogram showing the state when the engine stop control routine of FIG. 7 is carried out for the first time;

FIG. 14 is a nomogram showing the state when the processing of steps S106 through S116 in the engine stop control routine has repeatedly been executed;

FIG. 15 is a nomogram showing the state when the revolving speed Ne of the engine 150 becomes equal to or less than the threshold value Nref;

FIG. 16 shows variations in revolving speed Ne of the engine 150 and torque Tm1 of the first motor MG1;

FIG. 17 is a flowchart showing a modified engine stop control routine;

FIG. 18 schematically illustrates another power output apparatus 110A as a modified example;

FIG. 19 schematically illustrates still another power output apparatus 110B as another modified example;

FIG. 20 schematically illustrates structure of another power output apparatus 110' as a second embodiment according to the present invention;

FIG. 21 illustrates an exemplified structure of an open-close timing changing mechanism 153;

DESCRIPTION OF THE PREFERRED EMBODIMENTS

Figure 22:
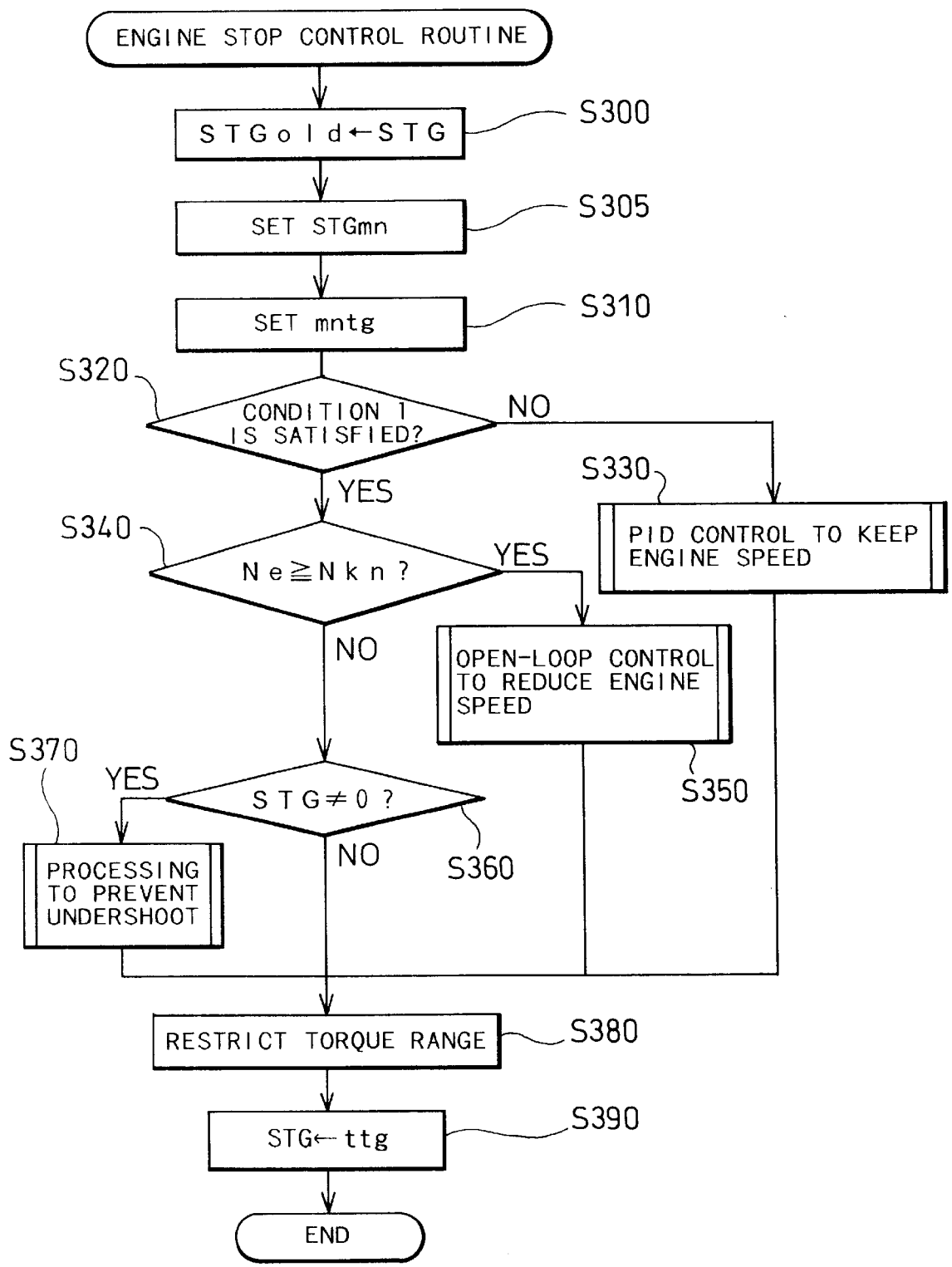
FIG. 22 is a flowchart showing an engine stop control routine carried out in the second embodiment.

One mode of carrying out the present invention is described as a preferred embodiment. FIG. 1 schematically illustrates structure of a power output apparatus 110 embodying the present invention; FIG. 2 is an enlarged view illustrating an essential part of the power output apparatus 110 of the embodiment; and FIG. 3 schematically illustrates general structure of a vehicle with the power output apparatus 110 of the embodiment incorporated therein. The general structure of the vehicle is described first for the convenience of explanation.

Referring to FIG. 3, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 152 to be explosively ignited and burned. Linear motion of a piston 154 pressed down by the explosion of the air/fuel mixture is converted to rotational motion of a crankshaft 156. The throttle valve 166 is driven to open and close by an actuator 168. An ignition plug 162 converts a high voltage applied from an igniter 158 via a distributor 160 to a spark, which explosively ignites and combusts the air/fuel mixture.

Operation of the engine 150 is controlled by an electronic control unit (hereinafter referred to as EFIECU) 170. The EFIECU 170 receives information from various sensors, which detect operating conditions of the engine 150. These sensors include a throttle valve position sensor 167 for detecting a valve travel or position of the throttle valve 166, a manifold vacuum sensor 172 for measuring a load applied to the engine 150, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is linked with a planetary gear 120, a first motor MG1, and a second motor MG2 (described later) via a damper 157 that reduces the amplitude of torsional vibrations occurring on the crankshaft 156. The crankshaft 156 is further connected to a differential gear 114 via a power transmission gear 111, which is linked with a drive shaft 112 working as the rotating shaft of the power transmission gear 111. The power output from the power output apparatus 110 is thus eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164a attached to an accelerator pedal 164, and a brake pedal position sensor 165a attached to a brake pedal 165, as described later in detail. The controller 180 sends and receives a variety of data and information to and from the EFIECU 170 through communication. Details of the control procedure including a communication protocol will be described later.

Referring to FIG. 1, the power output apparatus 110 of the embodiment primarily includes the engine 150, the damper 157 for connecting the crankshaft 156 of the engine 150 to a carrier shaft 127 so as to reduce the amplitude of the torsional vibrations of the crankshaft 156, the planetary gear 120 having a planetary carrier 124 linked with the carrier shaft 127, the first motor MG1 linked with a sun gear 121 of the planetary gear 120, the second motor MG2 linked with a ring gear 122 of the planetary gear 120, and the controller 180 for driving and controlling the first and the second motors MG1 and MG2.

The following describes structure of the planetary gear 120 and the first and the second motors MG1 and MG2 based on the drawing of FIG. 2. The planetary gear 120 includes the sun gear 121 linked with a hollow sun gear shaft 125 which the carrier shaft 127 passes through, the ring gear 122 linked with a ring gear shaft 126 coaxial with the carrier shaft 127, a plurality of planetary pinion gears 123 arranged between the sun gear 121 and the ring gear 122 to revolve around the sun gear 121 while rotating on its axis, and the planetary carrier 124 connecting with one end of the carrier shaft 127 to support the rotating shafts of the planetary pinion gears 123. In the planetary gear 120, three shafts, that is, the sun gear shaft 125, the ring gear shaft 126, and the carrier shaft 127 respectively connecting with the sun gear 121, the ring gear 122, and the planetary carrier 124, work as input and output shafts of the power. Determination of the power input to or output from any two shafts among the three shafts automatically determines the power input to or output from the residual one shaft. The details of the input and output operations of the power into and from the three shafts of the planetary gear 120 will be discussed later. Resolvers 139, 149, and 159 for measuring rotational angles θs, θr, and θc of the sun gear shaft 125, the ring gear shaft 126, and the carrier shaft 127 are respectively attached to the sun gear shaft 125, the ring gear shaft 126, and the carrier shaft 127.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. The stator 133 is prepared by laying thin plates of non-directional electromagnetic steel one upon another and is fixed to a casing 119. The first motor MG1 works as a motor for rotating the rotor 132 through the interaction between a magnetic field produced by the permanent magnets 135 and a magnetic field produced by the three-phase coils 134, or as a generator for generating an electromotive force on either ends of the three-phase coils 134 through the interaction between the magnetic field produced by the permanent magnets 135 and the rotation of the rotor 132.

Like the first motor MG1, the second motor MG2 is also constructed as a synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 14 is fixed to the casing 119. The stator 143 of the motor MG2 is also produced by laying thin plates of non-directional electromagnetic steel one upon another. Like the first motor MG1, the second motor MG2 also works as a motor or a generator.

The controller 180 for driving and controlling the first and the second motor MG1 and MG2 has the following configuration. Referring back to FIG. 1, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190$a$ used as a working memory, a ROM 190$b$ in which various control programs are stored, an input/output port (not shown), and a serial communication port (not shown) through which data is sent to and received from the EFIECU 170. The control CPU 190 receives a variety of data via the input port. The input data include a rotational angle θs of the sun gear shaft 125 measured with the resolver 139, a rotational angle θr of the ring gear shaft 126 measured with the resolver 149, a rotational angle θc of the carrier shaft 127 measured with the resolver 159, an accelerator pedal position AP (step-on amount of the accelerator pedal 164 ) output from the accelerator position sensor 164$a$, a brake pedal position BP (step-on amount of the brake pedal 165) output from the brake pedal position sensor 165$a$, a gearshift position SP output from the gearshift position sensor 184, values of currents Iu1 and Iv1 from two ammeters 195 and 196 disposed in the first driving circuit 191, values of currents Iu2 and Iv2 from two ammeters 197 and 198 disposed in the second driving circuit 192, and a remaining charge BRM of the battery 194 measured with a remaining charge meter 199. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW 2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 191. The power lines L1 and L2 are respectively connected to plus and minus terminals of the battery 194. The control signal SW1 output from the control CPU 190 thus successively controls the power-on time of the paired transistors Tr1 through Tr6. The electric currents flowing through the three-phase coils 134 undergo PWM (pulse width modulation) control to give quasi-sine waves, which enable the three-phase coils 134 to form a revolving magnetic field.

The six transistors Tr11 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 192. The second control signal SW2 output from the control CPU 190 thus successively controls the power-on time of the paired transistors Tr11 through Tr16. The electric currents flowing through the three-phase coils 144 undergo PWM control to give quasi-sine waves, which enable the three-phase coils 144 to form a revolving magnetic field.

The following describes the operation of the power output apparatus 110 of the first embodiment having the above construction. In the following discussion, the term 'power' is expressed by the product of the torque acting on a shaft and the revolving speed of the shaft and represents the magnitude of energy output per unit time. The term 'power state' denotes a driving point defined by a combination of the torque and the revolving speed that gives a certain power. There are, however, numerous combinations of the torque and the revolving speed to define a driving point that gives a certain power. The power output apparatus is controlled based on the energy flow at each moment, in other words, based on the energy balance per unit time. The term 'energy' herein is thus used as the synonym of 'power' and represents energy per unit time. In the same manner, both the terms 'electric power' and 'electrical energy' represent electrical energy per unit time.

The power output apparatus 110 of the embodiment thus constructed works in accordance with the operation principles discussed below, especially with the principle of torque conversion. By way of example, it is assumed that the engine 150 is driven at a driving point P1 of the revolving speed Ne and the torque Te and that the ring gear shaft 126 is driven at another driving point P2, which is defined by another revolving speed Nr and another torque Tr but gives an amount of energy identical with an energy Pe output from the engine 150. This means that the power output from the engine 150 is subjected to torque conversion and applied to the ring gear shaft 126. The relationship between the torque and the revolving speed of the engine 150 and the ring gear shaft 126 under such conditions is shown in the graph of FIG. 4.

According to the mechanics, the relationship between the revolving speed and the torque of the three shafts in the planetary gear 120 (that is, the sun gear shaft 125, the ring gear shaft 126, and the carrier shaft 127) can be expressed as nomograms illustrated in FIGS. 5 and 6 and solved geometrically. The relationship between the revolving speed and the torque of the three shafts in the planetary gear 120 may be analyzed numerically through calculation of energies of the respective shafts, without using the nomograms. For the clarity of explanation, the nomograms are used in this embodiment.

In the nomogram of FIG. 5, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the carrier shaft 127 is given as an interior division of the axes S and R at the ratio of 1 to ρ, where ρ represents a ratio of the number of teeth of the sun gear 121 to the number of teeth of the ring gear 122 and expressed as Equation (1) given below:

$$\rho = \frac{\text{the number of teeth of the sun gear}}{\text{the number of teeth of the ring gear}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the carrier shaft 127 linked with the crankshaft 156 of the engine 150, and the revolving speed Nr of the ring gear shaft 126 on the coordinate axis R of the ring gear shaft 126. A straight line passing through both the points is drawn, and a revolving speed Ns of the sun gear shaft 125 is then given as the intersection of this straight line and the coordinate axis S. This straight line is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given as Equation (2) below. In the planetary gear 120, the determination of the rotations of the two gears among the sun gear 121, the ring gear 122, and the planetary carrier 124 results in automatically setting the rotation of the residual one gear.

$$Ns = Nr - (Nr - Ne)\frac{1+\rho}{\rho} \quad (2)$$

The torque Te of the engine 150 is then applied (upward in the drawing) to the dynamic collinear line on the coordinate axis C of the carrier shaft 127 functioning as a line of action. The dynamic collinear line against the torque can be regarded as a rigid body to which a force is applied as a vector. Based on the technique of dividing the force into two different parallel lines of action, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \quad (3)$$

$$Ter = Te \times \frac{1}{1+\rho} \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes Is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy Pm2, which is given as the product of the torque Tm2 and the revolving speed Nr, as a power to the ring gear shaft 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. Referring to FIG. 4, the power that is expressed as the product of the torque Te and the revolving speed Ne and output from the engine 150 driven at the driving point P1 is subjected to torque conversion and output to the ring gear shaft 126 as the power of the same energy but expressed as the product of the torque Tr and the revolving speed Nr. As discussed previously, the power output to the ring gear shaft 126 is transmitted to a drive shaft 112 via the power feed gear 128 and the power transmission gear 111, and further transmitted to the driving wheels 116 and 118 via the differential gear 114. A linear relationship is accordingly held between the power output to the ring gear shaft 126 and the power transmitted to the driving wheels 116 and 118. The power transmitted to the driving wheels 116 and 118 can thus be controlled by adjusting the power output to the ring gear shaft 126.

Although the revolving speed Ns of the sun gear shaft 125 is positive in the nomogram of FIG. 5, it may be negative according to the revolving speed Ne of the engine 150 and the revolving speed Nr of the ring gear shaft 126 as shown in the nomogram of FIG. 6. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

The above description refers to the fundamental torque conversion in the power output apparatus 110 of the embodiment. The power output apparatus 110 can, however, perform other operations as well as the above fundamental operation that carries out the torque conversion for all the power output from the engine 150 and outputs the converted torque to the ring gear shaft 126. The possible operations include an operation of charging the battery 194 with the surplus electrical energy and an operation of supplementing an insufficient electrical energy with the electric power stored in the battery 194. These operations are implemented by regulating the power output from the engine 150 (that is, the product of the torque Te and the revolving speed Ne), the electrical energy Pm1 regenerated or consumed by the first motor MG1, and the electrical energy Pm2 regenerated or consumed by the second motor MG2.

The operation principle discussed above is on the assumption that the efficiency of power conversion by the planetary gear 120, the motors MG1 and MG2, and the transistors Tr1 through Tr16 is equal to the value '1', which represents 100%. In the actual state, however, the conversion efficiency is less than the value '1', and it is required to make the energy Pe output from the engine 150 a little greater than the energy Pr output to the ring gear shaft 126 or alternatively to make the energy Pr output to the ring gear shaft 126 a little smaller than the energy Pe output from the engine 150. By way of example, the energy Pe output from the engine 150 may be calculated by multiplying the energy Pr output to the ring gear shaft 126 by the reciprocal of the conversion efficiency. In the state of the nomogram of FIG. 5, the torque Tm2 of the second motor MG2 may be calculated by multiplying the electric power regenerated by the first motor MG1 by the efficiencies of both the motors MG1 and MG2. In the state of the nomogram of FIG. 6, on the other hand, the torque Tm2 of the second motor MG2 may be calculated by dividing the electric power consumed by the first motor MG1 by the efficiencies of both the motors MG1 and MG2. In the planetary gear 120, there is an energy loss or heat loss due to a mechanical friction or the like, though the amount of energy loss is significantly small, compared with the whole amount of energy concerned. The efficiency of the synchronous motors used as the first and the second motors MG1 and MG2 is very close to the value '1'. Known devices such as GTOs applicable to the transistors Tr1 through Tr16 have extremely small ON-resistance. The efficiency of power conversion is thus practically equal to the value '1'. For the matter of convenience, in the following discussion of the embodiment, the efficiency is considered equal to the value '1' (=100%), unless otherwise specified.

The following describes a control procedure of stopping the operation of the engine 150 while the vehicle is at a run through the above torque control, based on an engine stop control routine shown in the flowchart of FIG. 7. The engine stop control routine of FIG. 7 is executed when the driver gives a switching instruction to the motor driving mode only with the second motor MG2 or when the control CPU 190 of the controller 180 carries out an operation mode determination routine (not shown) and selects the motor driving mode only with the second motor MG2.

When the program enters the engine stop control routine, the control CPU 190 of the controller 180 first outputs an engine operation stop signal to the EFIECU 170 through communication to stop the operation of the engine 150 at step S100. In response to the engine operation stop signal, the EFIECU 170 stops fuel injection from the fuel injection valve 151 and application of a voltage to the ignition plug 162 and fully closes the throttle valve 166. These processes stop the operation of the engine 150.

The control CPU 190 then reads the revolving speed Ne of the engine 150 at step S102. The revolving speed Ne of the engine 150 may be calculated from the rotational angle θc of the carrier shaft 127 read from the resolver 159, which is attached to the carrier shaft 127 connecting with the crankshaft 156 via the damper 157. Alternatively the revolving speed Ne of the engine 150 may be measured directly with the speed sensor 176 attached to the distributor 160. In the latter case, the control CPU 190 receives data of the revolving speed Ne from the EFIECU 170 connected to the speed sensor 176 through communication.

After receiving the revolving speed Ne of the engine 150, the control CPU 190 sets an initial value on a time counter TC based on the input revolving speed Ne at step S104. The time counter TC is an argument used to set a target revolving speed Ne* of the engine 150 at step S108 (described later) and is incremented at step S106 every time when the processing of steps S106 through S116 is repeated. The initial value on the time counter TC is set based on a map showing the relationship between the time counter TC as the argument and the target revolving speed Ne* of the engine 150, for example, a map shown in FIG. 8. In accordance with a concrete procedure, the value of the time counter TC corresponding to the input revolving speed Ne (target revolving speed Ne*) plotted on the ordinate is read from the map of FIG. 8.

The control CPU 190 increments the preset time counter TC at step S106, and sets the target revolving speed Ne* of the engine 150 corresponding to the incremented time counter TC using the map shown in FIG. 8 at step S108. In accordance with a concrete procedure, the target revolving speed Ne* corresponding to the time counter TC plotted on the abscissa is read from the map of FIG. 8. A process of determining the target revolving speed Ne* corresponding to the value 'TC+1', which is the initial value on the time counter TC plus one, is shown in the map of FIG. 8. The control CPU 190 subsequently receives the revolving speed Ne of the engine 150 at step S110, and sets a torque command value Tm1* of the first motor MG1 based on the input revolving speed Ne and the preset target revolving speed Ne* according to Equation (5) given below at step S112. The first term on the right side of Equation (5) is a proportional term to cancel the deviation of the actual revolving speed Ne from the target revolving speed Ne*, and the second term on the right side is an integral term to cancel the stationary deviation. K1 and K2 denote proportional constants.

$$Tm1^* \leftarrow K1(Ne^*-Ne)+K2\int(Ne^*-Ne)dt \qquad (5)$$

The control CPU 190 then sets a torque command value Tm2* of the second motor MG2 based on a torque command value Tr* to be output to the ring gear shaft 126 and the preset torque command value Tm1* of the first motor MG1 according to Equation (6) given below at step S114. The second term on the right side of Equation (6) represents a torque applied to the ring gear shaft 126 via the planetary gear 120 when the torque defined by the torque command value Tm1* is output from the first motor MG1 while the engine 150 is at a stop. K3 denotes a proportional constant. The proportional constant K3 is equal to one in the state of equilibrium on the dynamic collinear line in the nomogram. In a transient state in the course of stopping the operation of the engine 150, part of the torque output from the first motor MG1 is used to change the motion of the inertial system consisting of the engine 150 and the first motor MG1. The proportional constant K3 is accordingly smaller than one. A concrete procedure for accurately determining this torque calculates a torque (inertial torque) used to change the motion of the inertial system by multiplying a moment of inertia seen from the first motor MG1 of the inertial system by an angular acceleration of the sun gear shaft 125, subtracts the inertial torque from the torque command value Tm1*, and divides the difference by the gear ratio ρ. Since the torque command value Tm1* set by this routine is a relatively small value, the procedure of this embodiment utilizes the proportional constant K3 to simplify the calculation. The torque command value Tr* to be output to the ring gear shaft 126 is set based on the step-on amount of the accelerator pedal 164 by the driver according to a required torque setting routine shown in the flowchart of FIG. 9. The following discusses the procedure of setting the torque command value Tr*.

$$Tm2^* \leftarrow Tr^* - K3 \times \frac{Tm1^*}{\rho} \quad (6)$$

The required torque setting routine of FIG. 9 is repeatedly executed at predetermined time intervals (for example, at every 8 msec). When the program enters the routine of FIG. 9, the control CPU 190 of the controller 180 first reads the revolving speed Nr of the ring gear shaft 126 at step S130. The revolving speed Nr of the ring gear shaft 126 may be calculated from the rotational angle θr of the ring gear shaft 126 read from the resolver 149. The control CPU 190 then reads the accelerator pedal position AP detected by the accelerator pedal position sensor 164a at step S132. The driver steps on the accelerator pedal 164 when feeling insufficiency of the output torque. The value of the accelerator pedal position AP accordingly represents the desired torque to be output to the ring gear shaft 126 and eventually to the driving wheels 116 and 118. The control CPU 190 subsequently determines the torque command value Tr*, that is, the target torque to be output to the ring gear shaft 126, based on the input revolving speed Nr of the ring gear shaft 126 and the input accelerator pedal position AP at step S134. Not the torque to be output to the driving wheels 116 and 118 but the torque to be output to the ring gear shaft 126 is calculated here from the accelerator pedal position AP and the revolving speed Nr. This is because the ring gear shaft 126 is mechanically linked with the driving wheels 116 and 118 via the power feed gear 128, the power transmission gear 111, and the differential gear 114 and the determination of the torque to be output to the ring gear shaft 126 thus results in determining the torque to be output to the driving wheels 116 and 118. In this embodiment, a map representing the relationship between the torque command value Tr*, the revolving speed Nr of the ring gear shaft 126, and the accelerator pedal position AP is prepared in advance and stored in the ROM 190b. In accordance with a concrete procedure, at step S134, the torque command value Tr* corresponding to the input accelerator pedal position AP and the input revolving speed Nr of the ring gear shaft 126 is read from the map stored in the ROM 190b. An example of available maps is shown in FIG. 10.

Referring back to the flowchart of FIG. 7, after setting the torque command value Tm1* of the first motor MG1 at step S112 and the torque command value Tm2* of the second motor MG2 at step S114, the program repeatedly executes a control routine of the first motor MG1 shown in the flowchart of FIG. 11 and a control routine of the second motor MG2 shown in the flowchart of FIG. 12 at predetermined time intervals (for example, at every 4 msec) through an interruption process, thereby controlling the first motor MG1 and the second motor MG2 to output the torques defined by the preset torque command values. The control procedures of the first motor MG1 and the second motor MG2 will be described later.

The control CPU 190 of the controller 180 then compares the revolving speed Ne of the engine 150 with a threshold value Nref at step S116. The threshold value Nref is set to be close to the target revolving speed Ne* of the engine 150 determined by the processing in the motor driving mode with only the second motor MG2. In this embodiment, the target revolving speed Ne* of the engine 150 determined by the processing in the motor driving mode with only the second motor MG2 is equal to zero, and the threshold value Nref is set to be close to zero. The threshold value Nref is smaller than the lower limit of a specific revolving speed range, in which the system connecting to the crankshaft 156 and the carrier shaft 127 linked with each other via the damper 157 causes a resonance. In case that the revolving speed Ne of the engine 150 is greater than the threshold value Nref, the program determines a transient state in the course of stopping the operation of the engine 150 and that the revolving speed Ne of the engine 150 is still not less than the lower limit of the specific revolving speed range that causes a resonance. The program accordingly returns to step S106 and repeats the processing of steps S106 through S116. Every time when the processing of steps S106 through S116 is repeated, the time counter TC is incremented and a smaller value is read from the map shown in FIG. 8 and set to the target revolving speed Ne* of the engine 150. The revolving speed Ne of the engine 150 thus decreases by a similar slope to that of the target revolving speed Ne* shown in the map of FIG. 8. In case that the slope of the target revolving speed Ne* is set to be not less than the slope of a natural variation in revolving speed Ne at the time of stopping the fuel injection to the engine 150, the revolving speed Ne of the engine 150 can be decreased abruptly. In case that the slope of the target revolving speed Ne* is set to be less than the slope of the natural variation in revolving speed Ne, on the contrary, the revolving speed Ne of the engine 150 can be decreased gently. In this embodiment, the slope of the target revolving speed Ne* is set to be not less than the slope of the natural variation in revolving speed Ne, on the assumption that the revolving speed Ne passes through the specific revolving speed range that causes a resonance.

In case that the revolving speed Ne of the engine 150 becomes equal to or less than the threshold value Nref at step S116, on the other hand, the program sets a cancel torque Tc to the torque command value Tm1* of the first motor MG1 at step S118, sets the torque command value Tm2* of the second motor MG2 according to Equation (6) given above at step S120, and waits for a predetermined time period at step S122. The cancel torque Tc prevents the revolving speed Ne of the engine 150 from taking a negative value, that is, undershooting. The reason why the revolving speed Ne of the engine 150 undershoots when the operation of the engine 150 is positively stopped by the first motor MG1 under the PI control, has been described previously.

After the predetermined time period has elapsed while the first motor MG1 outputs the cancel torque Tc, the program sets the torque command value Tm1* of the first motor MG1 equal to zero at step S124 and the torque command value Tm2* of the second motor MG2 equal to the torque command value Tr* at step S126. The program then exits from this routine and executes the processing in the motor driving mode with only the second motor MG2 (not shown).

The control operation of the first motor MG1 follows the control routine of the first motor MG1 shown in the flowchart of FIG. 11. When the program enters the routine of FIG. 11, the control CPU 190 of the controller 180 first receives the rotational angle θs of the sun gear shaft 125 from the revolver 139 at step S180, and calculates an electrical angle θ1 of the first motor MG1 from the rotational angle θs of the sun gear shaft 125 at step S181. In this embodiment, since a synchronous motor of four-pole pair (that is, four N poles and four S poles) is used as the first motor MG1, the rotational angle θs of the sun gear shaft 125 is quadrupled to yield the electrical angle θ1 (θ1=4θs). The CPU 190 then detects values of currents Iu1 and Iv1 flowing through the U phase and V phase of the three-phase coils 134 in the first motor MG1 with the ammeters 195 and 196 at step S182. Although the currents naturally flow through all the three phases U, V, and W, measurement is required only for the currents passing through the two phases since the sum of the currents is equal to zero. At subsequent step S184, the control CPU 190 executes transformation of coordinates (three-phase to two-phase transformation) using the values of currents flowing through the three phases obtained at step S182. The transformation of coordinates maps the values of currents flowing through the three phases to the values of currents passing through d and q axes of the permanent magnet-type synchronous motor and is executed according to Equation (7) given below. The transformation of coordinates is carried out because the currents flowing through the d and q axes are essential for the torque control in the permanent magnet-type synchronous motor. Alternatively, the torque control may be executed directly with the currents flowing through the three phases.

$$\begin{bmatrix} Id1 \\ Iq1 \end{bmatrix} = \sqrt{2} \begin{bmatrix} -\sin(\theta 1 - 120) & \sin\theta 1 \\ -\cos(\theta 1 - 120) & \cos\theta 1 \end{bmatrix} \begin{bmatrix} Iu1 \\ Iv1 \end{bmatrix} \quad (7)$$

After the transformation to the currents of two axes, the control CPU 190 computes deviations of currents Id1 and Iq1 actually flowing through the d and q axes from current command values Id1* and Iq1* of the respective axes, which are calculated from the torque command value Tm1* of the first motor MG1, and subsequently determines voltage command values Vd1 and Vq1 with respect to the d and q axes at step S186. In accordance with a concrete procedure, the control CPU 190 executes arithmetic operations of Equations (8) and Equations (9) given below. In Equations (9), Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (9)) and a summation of historical data of the deviations ΔI for 'i' times (the second term on the right side).

$$\Delta Id1 = Id1^* - Id1$$

$$\Delta Iq1 = Iq1^* - Iq1 \quad (8)$$

$$Vd1 = Kp1 \cdot \Delta Id1 + \Sigma Ki1 \cdot \Delta Id1$$

$$Vq1 = Kp2 \cdot \Delta Iq1 + \Sigma Ki2 \cdot \Delta Iq1 \quad (9)$$

The control CPU 190 then re-transforms the coordinates of the voltage command values thus obtained (two-phase to three-phase transformation) at step S188. This corresponds to an inverse of the transformation executed at step S184. The inverse transformation determines voltages Vu1, Vv1, and Vw1 actually applied to the three-phase coils 134 as expressed by Equations (10) given below:

$$\begin{bmatrix} Vu1 \\ Vv1 \end{bmatrix} = \sqrt{\frac{2}{3}} \begin{bmatrix} \cos\theta 1 & -\sin\theta 1 \\ \cos(\theta 1 - 120) & -\sin(\theta 1 - 120) \end{bmatrix} \begin{bmatrix} Vd1 \\ Vq1 \end{bmatrix} \quad (10)$$

$$Vw1 = -Vu1 - Vv1$$

The actual voltage control is accomplished by on-off operation of the transistors Tr1 through Tr6 in the first driving circuit 191. At step S189, the on- and off-time of the transistors Tr1 through Tr6 in the first driving circuit 191 is PWM (pulse width modulation) controlled, in order to attain the voltage command values Vu1, Vv1, and Vw1 determined by Equations (10) given above.

It is assumed that the torque command value Tm1* of the first motor MG1 is positive when the torque Tm1 is applied in the direction shown in the nomograms of FIGS. 5 and 6. For an identical positive torque command value Tm1*, the first motor MG1 is controlled to carry out the regenerative operation when the torque command value Tm1* acts in reverse of the rotation of the sun gear shaft 125 as in the state of the nomogram of FIG. 5, and controlled to carry out the power operation when the torque command value Tm1* acts in the direction of rotation of the sun gear shaft 125 as in the state of the nomogram of FIG. 6. For the positive torque command value Tm1*, both the regenerative operation and the power operation of the first motor MG1 implement the identical switching control. In accordance with a concrete procedure, the transistors Tr1 through Tr6 in the first driving circuit 191 are controlled to enable a positive torque to be applied to the sun gear shaft 125 by the combination of the magnetic field generated by the permanent magnets 135 set on the outer surface of the rotor 132 with the revolving magnetic field generated by the currents flowing through the three-phase coils 134. The identical switching control is executed for both the regenerative operation and the power operation of the first motor MG1 as long as the sign of the torque command value Tm1* is not changed. The control routine of the first motor MG1 shown in the flowchart of FIG. 11 is thus applicable to both the regenerative operation and the power operation. When the torque command value Tm1* is negative, the rotational angle θs of the sun gear shaft 125 read at step S180 is varied in a reverse direction. The control routine of the first motor MG1 shown in FIG. 11 is thus also applicable to this case.

The control operation of the second motor MG2 follows the control routine of the second motor MG2 shown in the flowchart of FIG. 12. The control procedure of the second motor MG2 is identical with that of the first motor MG1, except that the torque command value Tm2* and the rotational angle θr of the ring gear shaft 126 are used in place of the torque command value Tm1* and the rotational angle θs of the sun gear shaft 125. When the program enters the routine of FIG. 12, the control CPU 190 of the controller 180 first receives the rotational angle θr of the ring gear shaft 126 from the revolver 149 at step S190, and calculates an electrical angle θ2 of the second motor MG2 from the observed rotational angle θr of the ring gear shaft 126 at step S191. At subsequent step S192, phase currents Iu2 and Iv2 of the second motor MG2 are measured with the ammeters 197 and 198. The control CPU 190 then executes transformation of coordinates for the phase currents at step S194, computes voltage command values Vd2 and Vq2 at step S196, and executes inverse transformation of coordinates for the voltage command values at step S198. The control CPU 190 subsequently determines the on- and off-time of the transistors Tr11 through Tr16 in the second driving circuit 192 for the second motor MG2 and carries out the PWM control at step S199.

The second motor MG2 is also controlled to carry out either the regenerative operation or the power operation, based on the relationship between the direction of the torque command value Tm2* and the direction of the rotation of the ring gear shaft 126. Like the first motor MG1, the control process of the second motor MG2 shown in the flowchart of FIG. 12 is applicable to both the regenerative operation and the power operation. In this embodiment, it is assumed that the torque command value Tm2* of the second motor MG2 is positive when the torque Tm2 is applied in the direction shown in the nomogram of FIG. 5.

The following describes variations in revolving speed Ne of the engine 150 and torque Tm1 of the first motor MG1 during the control process to stop the engine 150, with the nomograms of FIGS. 13 through 15 and the graph of FIG. 16. FIG. 13 is a nomogram showing the state when the engine stop control routine of FIG. 7 is carried out for the first time; FIG. 14 is a nomogram showing the state when the processing of steps S106 through S116 in the engine stop control routine has repeatedly been executed; and FIG. 15 is a nomogram showing the state when the revolving speed Ne of the engine 150 becomes equal to or less than the threshold value Nref. As discussed above, in this embodiment, the slope of the target revolving speed Ne* in the map of FIG. 8 is set to be not less than the slope of the natural variation in revolving speed Ne. As shown in FIGS. 13 and 14, the torque Tm1 output from the first motor MG1 thus acts to forcibly decrease the revolving speed Ne of the engine 150. When the engine stop control routine is carried out for the first time, the torque Tm1 is applied in reverse of the rotation of the sun gear shaft 125, and the first motor MG1 accordingly functions as a generator. The revolving speed Ns of the sun gear shaft 125 then takes a negative value as shown in FIG. 14, and the first motor MG1 functions as a motor. At this moment, the first motor MG1 is under the PI control based on the revolving speed Ne of the engine 150 and the target revolving speed Ne*. The revolving speed Ne of the engine 150 thus varies with a little delay from the target revolving speed Ne* as shown in FIG. 16. As discussed previously with the nomogram of FIG. 6, the revolving speed Ns of the sun gear shaft 125 may take a negative value according to the revolving speed Ne of the engine 150 and the revolving speed Nr of the ring gear shaft 126 in the state prior to the output of an engine operation stop instruction. The nomogram of FIG. 14 may accordingly represent the state when the engine stop control routine is carried out for the first time. In this case, the first motor MG1 functions as a motor from the beginning.

In the state of the nomograms of FIGS. 13 and 14, the fuel supply to the engine 150 is stopped, and no torque is accordingly output from the engine 150. The first motor MG1 outputs the torque Tm1 that forcibly reduces the revolving speed Ne of the engine 150, and a torque Tsc is then applied to the carrier shaft 127 as a reaction of the torque Tm1. The ring gear shaft 126, on the other hand, receives the torque Tm2 output from the second motor MG2 and a torque Tsr output via the planetary gear 120 accompanied by the torque Tm1 output from the first motor MG1. The torque Tsr applied to the ring gear shaft 126 can be calculated by taking into account the equilibrium on the dynamic collinear line and the variation in motion of the inertial system consisting of the engine 150 and the first motor MG1. The torque Tsr is almost equivalent to the second term on the right side of Equation (6). Namely the torque approximate to the torque command value Tr* is thus output to the ring gear shaft 126.

When the revolving speed Ne of the engine 150 becomes equal to or less than the threshold value Nref at step S116 in the engine stop control routine of FIG. 7, the first motor MG1 outputs the cancel torque Tc. The engine 150 accordingly stops without undershooting the revolving speed Ne of the engine 150 as shown by the broken lines in FIG. 16, and the operation mode is smoothly shifted to the motor driving mode with only the second motor MG2. In this embodiment, the torque command value Tm1* of the first motor MG1 is set equal to zero in the motor driving mode with only the second motor MG2. The dynamic collinear line is thus stably kept in the state having the least sum of the energy required for racing the engine 150 and the energy required for racing the first motor MG1. Since the engine 150 is a gasoline engine in the embodiment, the energy required for racing the engine 150, that is, the energy required for friction and compression of the piston in the engine 150, is greater than the energy required for racing the rotor 132 of the first motor MG1. The dynamic collinear line is accordingly in the state of stopping the engine 150 and racing the first motor MG1 as shown in the nomogram of FIG. 15. The cancel torque Tc output from the first motor MG1 is also shown in the nomogram of FIG. 15.

As discussed above, the power output apparatus 110 of the embodiment quickly reduces the revolving speed Ne of the engine 150 to zero in response to an instruction for stopping the operation of the engine 150. This allows the revolving speed Ne of the engine 150 to swiftly pass through the specific revolving speed range that causes a resonance of the torsional vibrations on the engine 150 and the first motor MG1 as the inertial mass. This results in enabling the simplified structure of the damper 157 for reducing the amplitude of the torsional vibrations.

In the power output apparatus 110 of the embodiment, the first motor MG1 outputs the cancel torque Tc in the direction of increasing the revolving speed Ne of the engine 150, immediately before the revolving speed Ne of the engine 150 becomes equal to zero. This structure effectively prevents the revolving speed Ne of the engine 150 from undershooting, thereby preventing occurrence of a vibration and a foreign noise due to undershooting.

The power output apparatus 110 of the embodiment uses the map wherein the slope of the target revolving speed Ne* is greater than the slope of the natural variation in revolving speed Ne of the engine 150 (for example, the map of FIG. 8), and accordingly enables the first motor MG1 to output the torque Tm1 that forcibly reduces the revolving speed Ne of the engine 150. In accordance with an alternative application, another map wherein the slope of the target revolving speed Ne* is less than the slope of the natural variation in revolving speed Ne of the engine 150 is used in place of the map of FIG. 8, so as to enable a gentle variation in revolving speed Ne of the engine 150. This alternative structure allows the revolving speed Ne of the engine 150 to be gently varied.

In accordance with still another possible application, another map wherein the slope of the target revolving speed Ne* is identical with the slope of the natural variation in revolving speed Ne of the engine 150 is used in place of the map of FIG. 8, so as to enable a natural variation in revolving speed Ne of the engine 150. In this case, the torque command value Tm1* of the first motor MG1 is set equal to zero when the operation of the engine 150 is stopped. The flowchart of FIG. 17 shows an engine stop control routine in this modified application. In this routine, the program sets the torque command value Tm1* of the first motor MG1 equal to zero at step S202 and sets the torque command value Tm2* of the second motor MG2 equal to the torque command value Tr* at step S210. No torque is accordingly output from the first motor MG1. While the kinetic energy of the engine 150 and the first motor MG1 is consumed by the friction and compression of the piston in the engine 150, the dynamic collinear line is shifted toward the state having the least sum of the energy required for racing the engine 150 and the energy required for racing the first motor MG1

(that is, the state in the nomogram of FIG. 15). When no torque is output from the first motor MG1, the first MG1 does not consume any electric power. This structure accordingly improves the energy efficiency of the whole power output apparatus. The engine stop control routine of FIG. 17 can be regarded as the processing routine in the motor driving mode with only the second motor MG2.

In the power output apparatus 110 of the embodiment, the target revolving speed Ne* of the engine 150 is set equal to zero in the motor driving mode with only the second motor MG2 and the threshold value Nref is then set approximate to or equal to zero. In accordance with another possible application, the target revolving speed Ne* of the engine 150 may be set equal to a specific value other than zero in the motor driving mode with only the second motor MG2. In this case, the threshold value Nref is set approximate to or equal to the specific value. By way of example, the idle revolving speed is set to the target revolving speed Ne* of the engine 150, and the threshold value Nref is set approximate to or equal to the idle revolving speed.

In the power output apparatus 110 of the embodiment discussed above, the control procedure is applied to regulate the revolving speed Ne of the engine 150 at the time of stopping the operation of the engine 150 while the vehicle is at a run, that is, while the ring gear shaft 126 rotates. The control procedure is also applicable to regulate the revolving speed Ne of the engine 150 at the time of stopping the operation of the engine 150 while the vehicle is at a stop, that is, while the ring gear shaft 126 does not rotate.

In the power output apparatus 110 of the embodiment, the torque command value Tm1* of the first motor MG1 and the torque command value Tm2* of the second motor MG2 are set in the engine stop control routine. In accordance with an alternative application, the torque command value Tm1* of the first motor MG1 is set in the control routine of the first motor MG1 and the torque command value Tm2* of the second motor MG2 in the control routine of the second motor MG2.

In the power output apparatus 110 of the embodiment, the power output to the ring gear shaft 126 is taken out of the arrangement between the first motor MG1 and the second motor MG2 via the power feed gear 128 linked with the ring gear 122. Like another power output apparatus 110A shown in FIG. 18 as a modified example, however, the power may be taken out of the casing 119, from which the ring gear shaft 126 is extended. FIG. 19 shows still another power output apparatus 110B as another modified example, wherein the engine 150, the planetary gear 120, the second motor MG2, and the first motor MG1 are arranged in this sequence. In this case, a sun gear shaft 125B may not have a hollow structure, whereas a hollow ring gear shaft 126B is required. This modified structure enables the power output to the ring gear shaft 126B to be taken out of the arrangement between the engine 150 and the second motor MG2.

The following describes another power output apparatus 110' as a second embodiment according to the present invention. The power output apparatus 110' of the second embodiment shown in FIG. 20 has a similar hardware structure to that of the power output apparatus 110 of the first embodiment, except that the engine 150 has an open-close timing changing mechanism 153 in the second embodiment. The difference in hardware structure, which is discussed below, leads to the different processing routines carried out by the controller 180.

Referring to FIG. 20, the open-close timing changing mechanism 153 adjusts the open-close timing of an intake valve 150a of the engine 150. FIG. 21 shows the detailed structure of the open-close timing changing mechanism 153. The intake valve 150a is generally opened and closed by a cam attached to an intake cam shaft 240, whereas an exhaust valve 150b is opened and closed by a cam attached to an exhaust cam shaft 244. An intake cam shaft timing gear 242 linked with the intake cam shaft 240 and an exhaust cam shaft timing gear 246 linked with the exhaust cam shaft 244 are connected with the crankshaft 156 via a timing belt 248, in order to open and close the intake valve 150a and the exhaust valve 150b at a timing corresponding to the revolving speed of the engine 150. In addition to these conventional elements, the open-close timing changing mechanism 153 further includes an OCV 254 that is connected with the intake cam shaft timing gear 242 and the intake cam shaft 240 via an oil pressure-driven VVT pulley 250 and functions as a control valve of input oil pressure of the VVT pulley 250. The VVT pulley 250 includes a set of movable pistons 252 that reciprocate in an axial direction by means of the oil pressure. The oil pressure input to the VVT pulley 250 is fed by an engine oil pump 256.

The open-close timing changing mechanism 153 works based on the following operation principle. The EFIECU 170 determines the open-close timing of the valve according to the driving conditions of the engine 150 and outputs a control signal to control the on-off state of the OCV 254. The output control signal varies the oil pressure input to the WT pulley 250 and thereby shifts the movable pistons 252 in the axial direction. The movable pistons 252 have threads running in an oblique direction with respect to the axis. The movement in the axial direction accordingly causes rotation of the movable pistons 252 and changes the orientation of the intake cam shaft 240 and the intake cam shaft timing gear 242 connecting with the movable pistons 252. This results in varying the open-close timing of the intake valve 150a and changing the valve overlap. In the example of FIG. 21, the VVT pulley 250 is disposed only on the side of the intake cam shaft 240 and does not exist on the side of the exhaust cam shaft 244, so that the valve overlap is controlled by regulating the open-close timing of the intake valve 150a.

Figure 23:
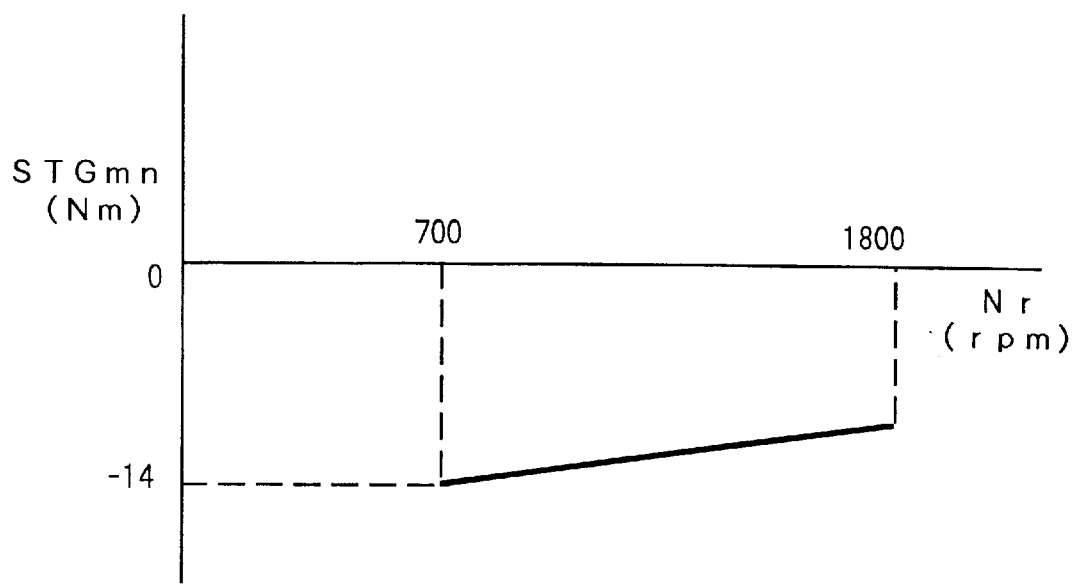
FIG. 23 is a graph showing the reduction torque STGmn plotted against the vehicle speed.
Figure 24:
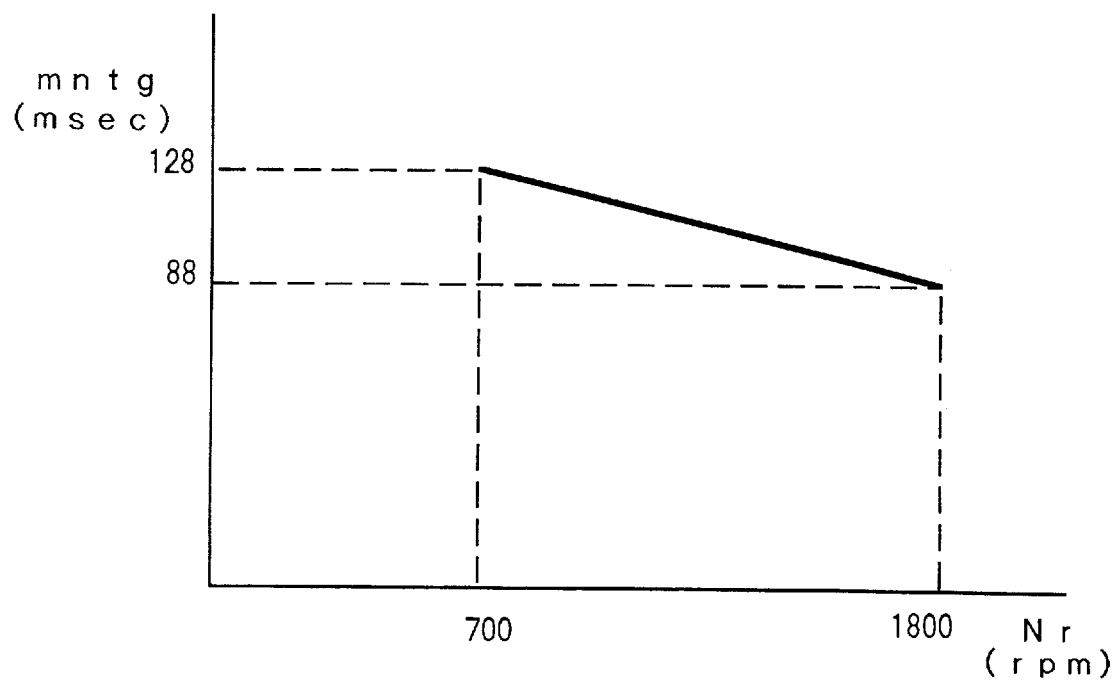
FIG. 24 is a graph showing the processing time mntg of slower speed reduction plotted against the vehicle speed.

The controller 180 carries out the following control operation in the second embodiment. FIG. 22 is a flowchart showing an engine stop control routine carried out in the second embodiment. The engine stop control routine is executed at every 8 msec by the interrupting operation after the controller 180 determines that the engine 150 is to be stopped, based on the driving state of the vehicle and the remaining charge SOC of the battery 194, and sends a stop instruction to the EFIECU 170 so as to cease the fuel injection into the engine 150. When the program enters the routine of FIG. 22, the control CPU 190 of the controller 180 (see FIG. 1) sets a current target torque STG of the first motor MG1 to a variable STGold at step S300, sets a reduction torque STGmn at step S305, and sets a processing time mntg of slower speed reduction at step S310. The reduction torque STGmn is set in advance against the revolving speed Nr of the ring gear shaft 126, that is, the vehicle speed, as shown in the graph of FIG. 23. In accordance with a concrete procedure of this embodiment, at step S305, the reduction torque STGmn corresponding to the revolving speed Nr of the ring gear shaft 126 is read from a map that represents the relationship of FIG. 23 and is stored in advance in the ROM 190b. The reduction torque STGmn denotes a torque applied by the first motor MG1 to the carrier shaft 127 and thereby to the crankshaft 156, in order to reduce the revolving speed of the engine 150 under the ceasing condition of fuel injection. The processing time mntg of slower speed reduction represents a time period specified as a degree of relieving the reduction rate of the revolving speed in the speed reduction process of an open-loop control discussed later, in order to prevent a torque shock. The processing time mntg of slower speed reduction is set to a small value according to the revolving speed Nr of the ring gear shaft 126 as shown in the graph of FIG. 24. The revolving speed Nr of the ring gear shaft 126 corresponds to the vehicle speed, so that the longer processing time mntg of slower speed reduction is desirably set for the lower vehicle speed to relieve the reduction rate of the torque command value. This effectively prevents a torque shock. The processing time mntg will be discussed more in the open-loop control carried out at step S350.

After setting these variables, the control CPU 190 determines whether or not Condition 1 is fulfilled at step S320. Condition 1 represents a preset condition to allow a start of the engine stop control and is, in this embodiment, that 300 msec has elapsed since an instruction was given to cease the fuel injection to the engine 150. The instruction to cease the fuel injection may not cause an immediate decrease in output torque of the engine 150. The waiting time of 300 msec is thus to ensure that the output torque of the engine 150 has certainly been decreased. In response to an instruction of the EFIECU 170, after the fuel cutting operation, the engine 150 controls the open-close timing changing mechanism 153 to set the open-close timing of the valve to the greatest lag angle. Such setting decreases the load applied at the time of a restart of the engine 150 and reduces the shock in the process of motoring the engine 150. In case that Condition 1 is not fulfilled, the program proceeds to step S330 to continue the PID control based on the difference between the actual revolving speed and the target revolving speed of the engine 150 and keep the revolving speed of the engine 150.

In case that Condition 1 is fulfilled and a start of the engine stop control is allowed, on the other hand, the program proceeds to step S340 to compare the revolving speed Ne of the engine 150 with a predetermined value Nkn. The predetermined value Nkn used herein is a condition to stop the open-loop control when the execution of the engine stop control has lowered the revolving speed Ne of the engine 150. In this embodiment, the predetermined value Nkn is set equal to 200 rpm under the condition of the vehicle at a stop, 250 rpm under the condition of the vehicle on a run with the brake off, and 350 rpm under the condition of the vehicle on a run with the brake on. These values were experimentally determined to prevent the revolving speed of the engine 150 from undershooting.

In case that the engine speed Ne is not smaller than the predetermined value Nkn at step S340, the program proceeds to step S350 to carry out the open-loop control and reduce the engine speed. The open-loop control will be discussed later with the flowchart of FIG. 25. Execution of the open-loop control gradually decreases the revolving speed Ne of the engine 150. When the revolving speed Ne of the engine 150 has decreased to be lower than the predetermined value Nkn, it is determined whether or not the current target torque STG is substantially equal to zero at step S360. In case that the current target torque STG is not substantially equal to zero, the program proceeds to step S370 to carry out the processing to prevent the revolving speed of the engine 150 from undershooting.

After the processing at any one of steps S330, S350, S360, and S370, the program goes to step S380 to restrict the torque range and to step S390 to set a calculated target torque ttg subjected to the processing of torque range restriction to the target torque STG. The program then exits from this routine. The processing of torque range restriction limits the calculated target torque ttg to the rated torque range of the first motor MG1 or to an available torque range based on the remaining charge of the battery 194.

The above procedure is repeatedly executed to regulate the revolving speed of the engine 150. Until 300 msec has elapsed since a stop of fuel supply to the engine 150, the PID control is carried on to keep the engine speed at the target revolving speed (steps S320 and S330). After 300 msec has elapsed, the PID control is replaced by the open-loop control to apply a torque from the first motor MG1 to the output shaft of the engine 150 or the crankshaft 156 in reverse of the rotation of the crankshaft 156 and thereby reduce the revolving speed of the engine 150 in a predetermined range of deceleration (steps S320, S340, and S350). This process is shown by Section A of FIG. 27. When the revolving speed Ne of the engine 150 becomes lower than the predetermined value Nkn, the open-loop control is concluded and the processing is carried out to prevent undershoot (steps S320, S340, S360, and S370). This process causes the target torque to gradually decrease and approach zero as shown by Section B of FIG. 27.

Figure 25:
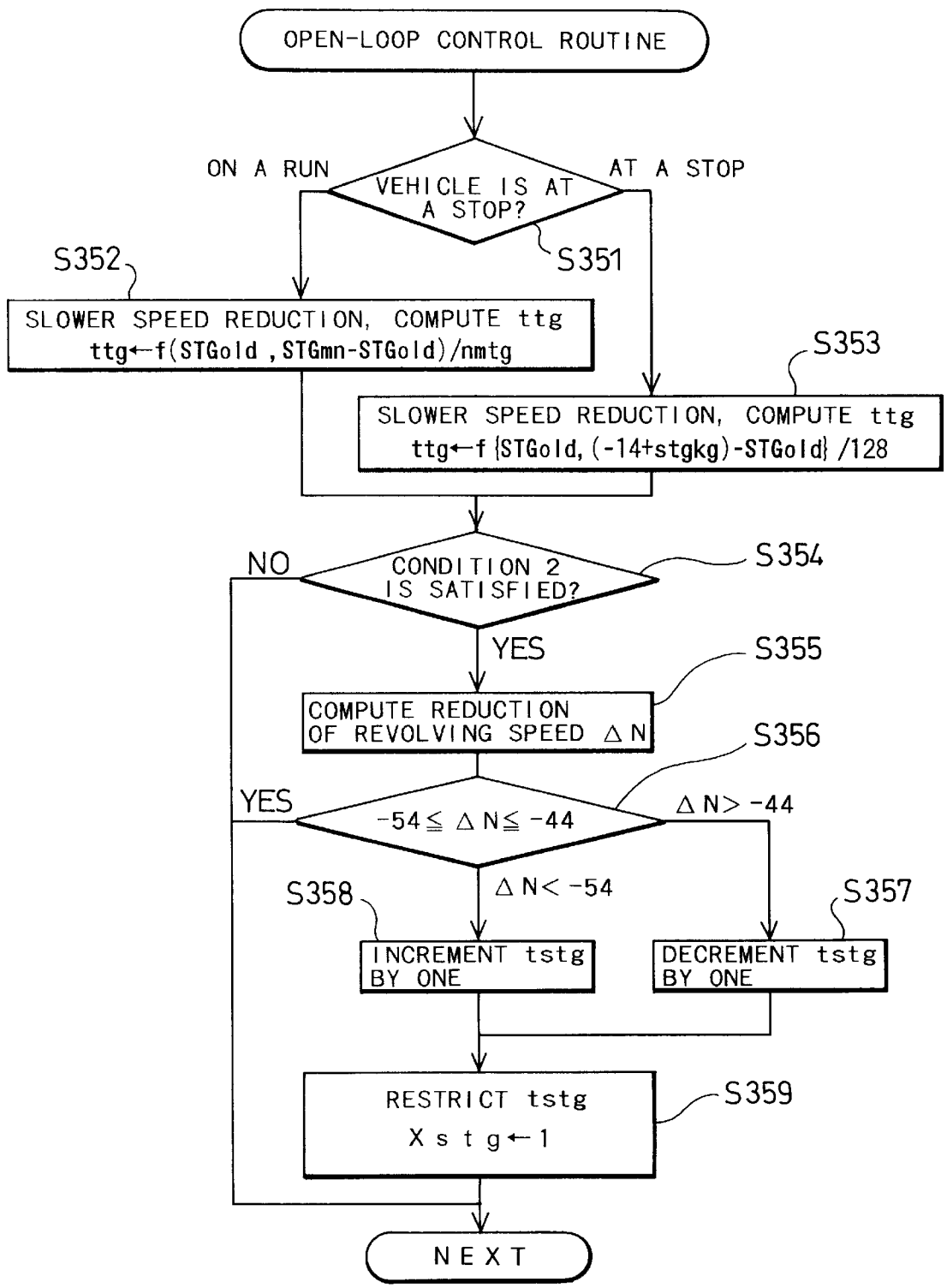
FIG. 25 is a flowchart showing an open-loop control routine.

The flowchart of FIG. 25 shows the details of the open-loop control executed at step S350. When the program enters the open-loop control routine, it is first determined whether the vehicle is at a stop or on a run at step S351. In case that the vehicle is on a run, the program proceeds to step S352 to carry out the processing of slower speed reduction using the target torque STGold and the reduction torque STGmn set at the start of the engine stop control and calculate a tentative target torque ttg. The processing of slower speed reduction is carried on for the processing time nmtg previously set according to the vehicle speed (see step S310 in the flowchart of FIG. 22 and FIG. 24). The processing of slower speed reduction mathematically represents an integration process, but may be realized by calculating the weighting average of the currently observed value and the target value in case that the processing is repeatedly executed at predetermined intervals like this embodiment. In this embodiment, the calculation of weighting average is carried out at every processing time nmtg and the weight added to the currently observed value is approximately one sixteenth the weight added to the target value. Immediately after the program enters the processing to stop the engine 150, the target torque STG is set up a specified value by the PID control described above (see FIG. 22 step S330). The processing of slower speed reduction thus does not abruptly set the reduction torque STGmn to the target torque immediately after the start of the engine stop control but gradually makes the value of the tentative target torque ttg approach the reduction torque STGmn set based on the map of FIG. 23. The longer processing time nmtg of slower speed reduction is set for the lower vehicle speed. The tentative target torque ttg accordingly approaches the reduction torque STGmn at the gentler rate against the lower vehicle speed.

When it is determined that the vehicle is at a stop at step S351, on the other hand, there is no need of varying the processing time of slower speed reduction according to the vehicle speed. The program thus proceeds to step S353 to carry out the processing of slower speed reduction for a fixed processing time (128 msec in this embodiment). The difference of the processing at step S353 under the condition of the vehicle at a stop from the processing at step S352 under the condition of the vehicle on a run is that the reduction torque STGmn set according to the vehicle speed is replaced by the sum of the fixed reduction torque and a learned value stgkg of the target torque. In accordance with a concrete procedure, at step S353, the processing of slower speed reduction is carried out using the current target torque STGold and the torque (−14+stgkg)−STGold. While the vehicle is on a run, the driver hardly feels the torque shock due to a stop of the engine 150. While the vehicle is at a stop, on the contrary, the driver readily feels the torque shock due to a stop of the engine 150. The program accordingly learns the behavior of reduction of the target torque under the condition of the vehicle at a stop, and thus enables the engine 150 to be stopped with substantially no undershoot. The concrete procedure of obtaining the learned value stgkg will be discussed later.

The above processing is executed at predetermined intervals, so that the tentative target torque gradually approaches the reduction torque STGmn at the rate depending upon the processing time nmtg of slower speed reduction. After the tentative target torque ttg becomes coincident with the reduction torque STGmn, the first motor MG1 outputs a substantially fixed torque.

After the processing of slower speed reduction either under the condition of the vehicle on a run or under the condition of the vehicle at a stop, it is determined whether or not Condition 2 is fulfilled at step S354. Condition 2 includes the following three conditions:
(1) The revolving speed Ne of the engine 150 is not greater than 400 rpm;
(2) The vehicle is at a stop; and
(3) The learned value stgkg has not yet been updated (that is, a flag Xstg representing execution of the learning process is not equal to one).

In case that any one of these three conditions is not fulfilled, the program immediately goes to NEXT and exits from this routine. In case that all the three conditions are fulfilled, on the other hand, the program halts the torque reduction and starts the processing to gradually decrease the target torque to zero. At step S355, a deceleration ΔN of the revolving speed is computed.

The deceleration ΔN of the revolving speed is defined as the difference between the previous revolving speed detected at a previous cycle and the current revolving speed detected at a current cycle. In this embodiment, detection of the revolving speed Ne is carried out at every 16 msec. The program then goes to step S356 to determine whether or not the deceleration ΔN of the revolving speed is within a range of −54 to −44. In case that the deceleration ΔN of the revolving speed is within this range, the program goes to NEXT and exits from this routine. In case that the deceleration ΔN of the revolving speed is greater than the value −44, a tentative learned value tstg is decremented by one at step S357. In case that the deceleration ΔN of the revolving speed is smaller than the value −54, on the other hand, the tentative learned value tstg is incremented by one at step S358. The procedure checks the reduction rate of the engine speed Ne in Section A of FIG. 27 and varies the tentative learned value tstg in order to affect the learned value stgkg in the process of determining the reduction torque under the condition of the vehicle at a stop in a next cycle of the open-loop control. In the case of the smaller reduction rate, such variation in tentative learned value tstg increases the absolute value of the target reduction torque, which is a negative value and is expressed as (−14+stgkg)−STGold) calculated at step S353. In the case of the greater reduction rate, on the contrary, the variation decreases the absolute value. The reduction rate of the revolving speed Ne of the engine 150 at the time of stopping the engine 150 is accordingly adjusted to the appropriate range of −54 Nm/16 msec to −44 Nm/16 msec through the learning control.

The program then goes to step S359 to restrict the tentative learned value tstg to a predetermined range and set the flag Xstg representing execution of the learning process equal to one. The procedure does not directly set the learned value stgkg but sets the tentative learned value tstg, in order to prevent the learned value used for the processing of slower speed reduction (step S353) from being changed at every cycle of this open-loop control routine. The learned value stgkg is used in a next cycle of the engine stop control.

The open-loop control routine discussed above is carried out after 300 msec has elapsed since a stop of fuel supply to the engine 150, and gradually increases the magnitude of the negative torque applied from the first motor MG1 to the output shaft of the engine 150 (that is, the torque applied in reverse of the rotation of the output shaft) toward the final torque determined according to the state of the vehicle, that is, at a stop or on a run. When the revolving speed Ne of the engine 150 gradually decreases as shown by Section A of FIG. 27 to or below 400 rpm, in case that the vehicle is at a stop, the learned value tstg depends upon the deceleration ΔN of the revolving speed.

Figure 26:
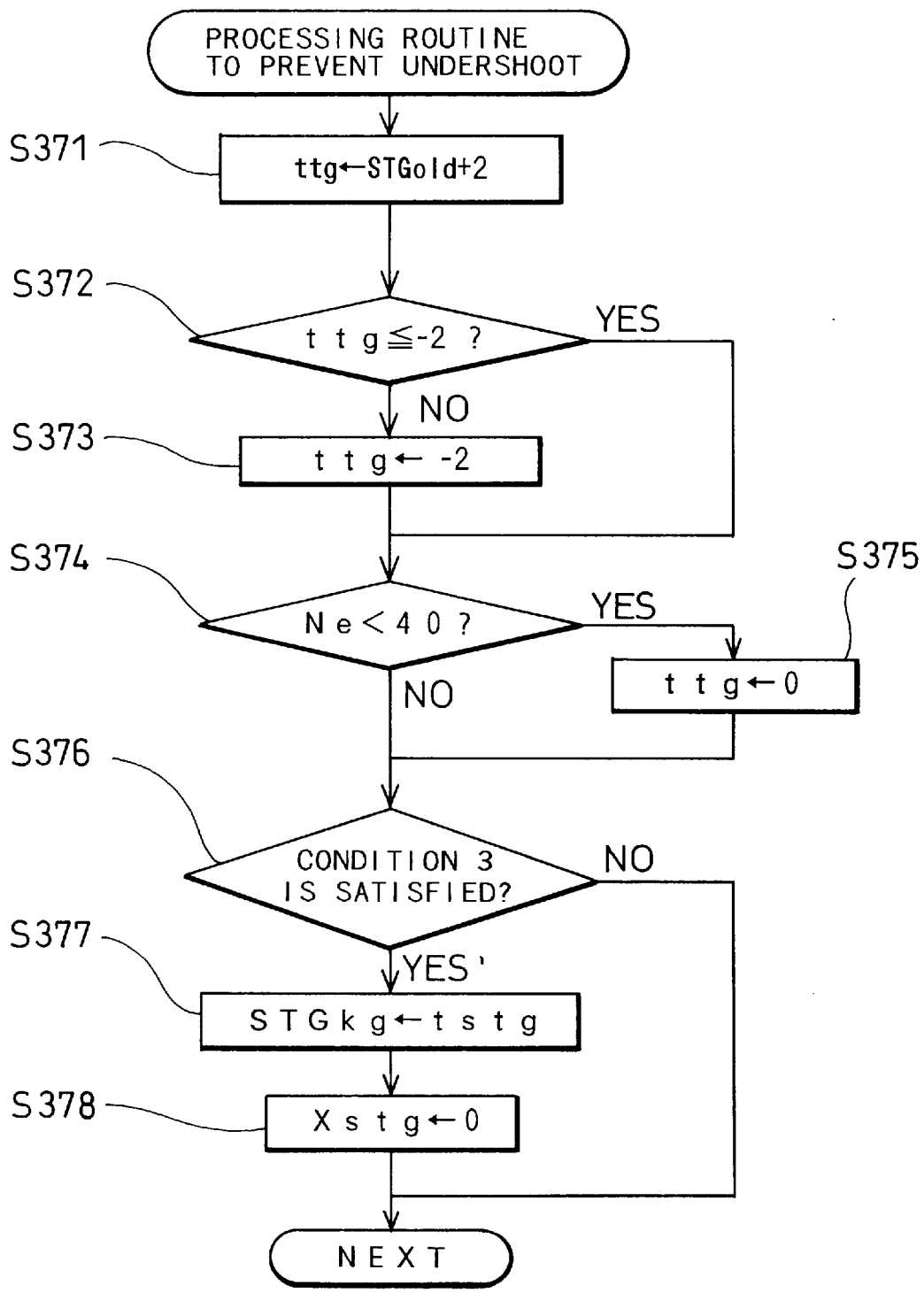
FIG. 26 is a flowchart showing a processing routine to prevent undershoot.

In case that the revolving speed Ne of the engine 150 gradually decreases and eventually becomes smaller than the predetermined value Nkn, the open-loop control is replaced by the processing to prevent undershoot (executed at step S370 in the flowchart of FIG. 22). The flowchart of FIG. 26 shows the details of the processing to prevent undershoot. When the program enters the routine of FIG. 26, the tentative target torque ttg is computed at step S371 according to the equation of:

$$ttg = STGold + 2 [Nm]$$

It is then determined whether or not the calculated tentative target torque ttg is not greater than −2 at step S372. In case that ttg is greater than −2, the tentative target torque ttg is set equal to −2 at step S373. The processing of steps S372 and S373 accordingly sets the upper limit (=−2) of the tentative target torque ttg.

This procedure gradually decreases the magnitude of the torque, which has been applied to reduce the revolving speed Ne of the output shaft of the engine 150, within a range that does not exceed −2 [Nm]. The variation in tentative target torque ttg according to the above equation decrements the magnitude of the torque, which has acted in the direction of decelerating the output shaft of the engine 150, by 2 [Nm] at every 8 msec that is the interval of the interrupting process. The torque thus gradually approaches zero (see Section B of FIG. 27).

After the processing of either step S372 or step S373, it is determined whether or not the revolving speed Ne of the engine 150 is less than 40 rpm at step S374. In case that the revolving speed Ne of the engine 150 is less than 40 rpm, the program determines no further necessity of applying the braking torque to the output shaft of the engine 150, and sets the tentative target torque ttg equal to zero at step S375.

The program then goes to step S376 to determine whether or not Condition 3 is fulfilled. Condition 3 includes the following two conditions:
(1) The vehicle is at a stop; and
(2) The learned value stgkg has been updated (that is, the flag Xstg representing execution of the learning process is equal to one).

In case that either one of these two conditions is not fulfilled, the program goes to NEXT and exist from this routine. In case that both the conditions are fulfilled, on the other hand, the program proceeds to step S377 to set the tentative learned value tstg to a learned value STGkg and to step S378 to reset the flag Xstg to zero. After the processing, the program exits from this routine.

Figure 27:
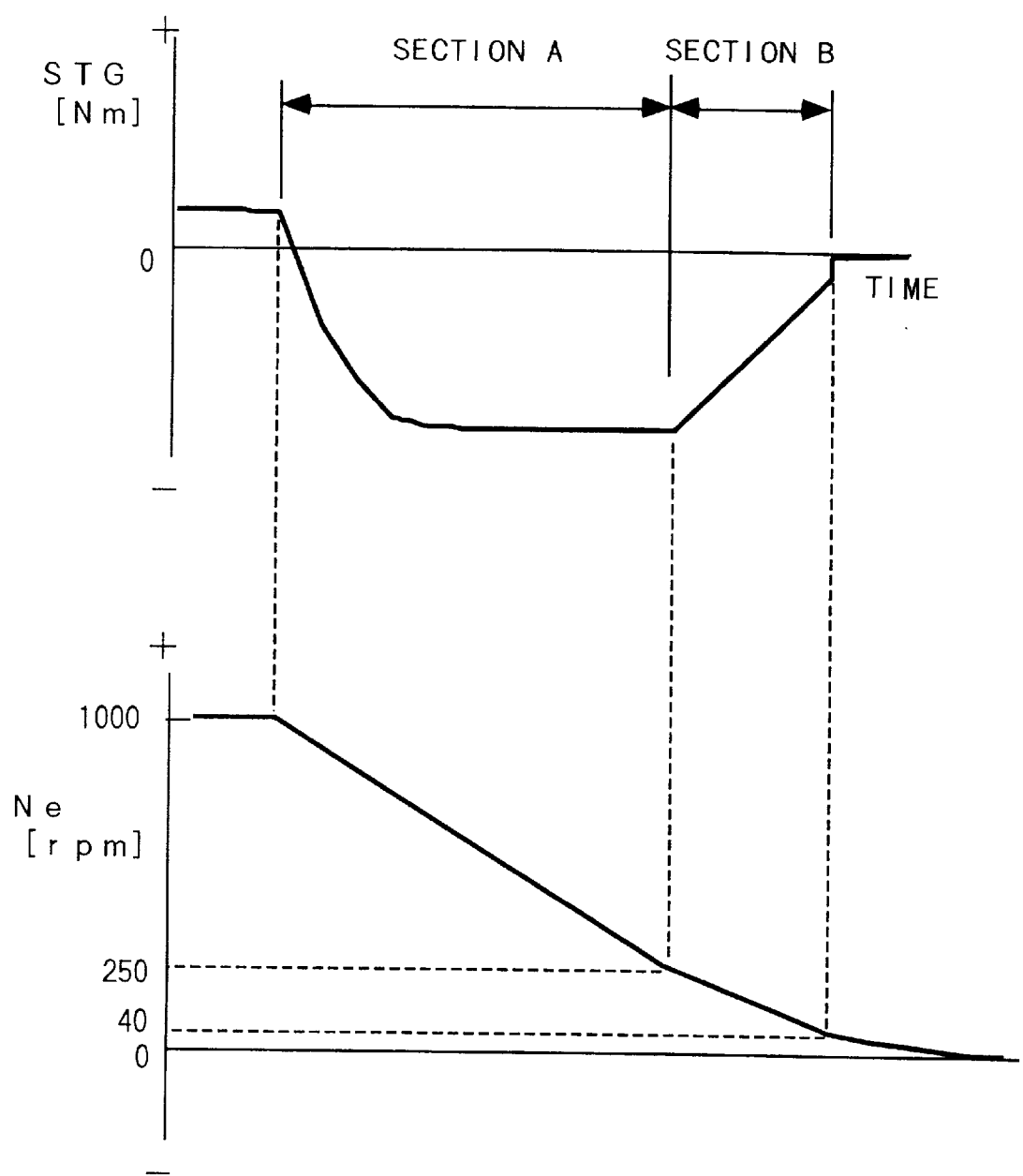
FIG. 27 is a graph showing an example of the control process carried out in the second embodiment.

The processing to prevent undershoot decreases the magnitude of the torque applied to the output shaft of the engine 150 toward −2 as shown by Section B of FIG. 27. When the revolving speed Ne of the engine 150 becomes less than 40 rpm, the braking torque is set equal to zero. This procedure effectively prevents the revolving speed Ne of the engine 150 from being lower than zero, that is, prevents undershoot.

The primary effects of the second embodiment are given below:

(1) While there is a requirement of continuous operation of the engine 150, the PID control is carried on to keep the revolving speed Ne of the engine 150 at a target revolving speed.

(2) When there is no requirement of continuous operation of the engine 150, the EFIECU 170 stops fuel supply to the engine 150. After 300 msec has elapsed since the stop of fuel supply, the open-loop control is carried out to cause the first motor MG1 to apply the torque in reverse of the rotation of the output shaft of the engine 150 to the carrier shaft 127, which is connected to the crankshaft 156 or the output shaft of the engine 150. The open-loop control does not execute the feed back control of the target torque of the first motor MG1 based on the deviation of the revolving speed Ne of the engine 150 from the target revolving speed (=0), but determines the target torque based on a predetermined algorithm. In the above embodiment, as shown in FIG. 27, the algorithm gradually increases the magnitude of the target torque at a predetermined rate. Such control effectively prevents a large torque from being abruptly applied in reverse of the rotation of the engine 150 at the time of stopping the engine 150 to cause a torque shock and worsen the drivability. As shown in FIG. 27, after the processing of slower speed reduction, the torque of a fixed magnitude is applied in reverse of the rotation of the output shaft of the engine 150. This makes the reaction torque constant and further improves the drivability.

(3) The first motor MG1 applies the torque in reverse of the rotation of the output shaft of the engine 150, so that the revolving speed Ne of the output shaft of the engine 150 is lowered at a predetermined deceleration (approximately −50 rpm/16 msec in this embodiment). The deceleration is limited to the range that does not cause torsional vibrations of the output shaft, and no torsional vibrations accordingly occur on the crankshaft 156 and the carrier shaft 127 connected to each other via the damper 157.

(4) When the revolving speed Ne of the engine 150 becomes lower than a predetermined level (400 rpm in this embodiment), in case that the vehicle is at a stop, the learning process is carried out to make the deceleration within a predetermined range in a next cycle of the engine stop control.

(5) When the revolving speed Ne of the engine 150 further decreases to or below the predetermined value Nkn (200 rpm through 350 rpm in this embodiment), the magnitude of the torque applied by the first motor MG1 is gradually decreased at a predetermined rate toward zero. This process effectively prevents the revolving speed Ne of the output shaft of the engine 150 from being lower than zero, that is, prevents the reverse rotation of the crankshaft 156. The crankshaft 156 is generally designed on the assumption of no reverse rotation. The reverse rotation of the crankshaft 156 may, for example, cause a lock of the lead angle in the open-close timing changing mechanism 153. In the structure of this embodiment, the magnitude of the torque applied to the output shaft of the engine 150 is decreased with a decrease in revolving speed Ne of the engine 150. When the revolving speed Ne of the engine 150 becomes lower than 40 rpm, the braking torque is set equal to zero. This structure effectively prevents the reverse rotation of the crankshaft 156.

(6) The predetermined value Nkn used as the criterion of the control procedure is set equal to 200 rpm under the condition of the vehicle at a stop, 250 rpm under the condition of the vehicle on a run with the brake off, and 350 rpm under the condition of the vehicle on a run with the brake on. This enables the torque applied to the output shaft of the engine 150 in the direction of reducing the revolving speed to be substantially constant irrespective of the driving state of the vehicle. The revolving speed of the engine 150 subjected to the open-loop control can thus been decreased gently to zero.

Figure 28:
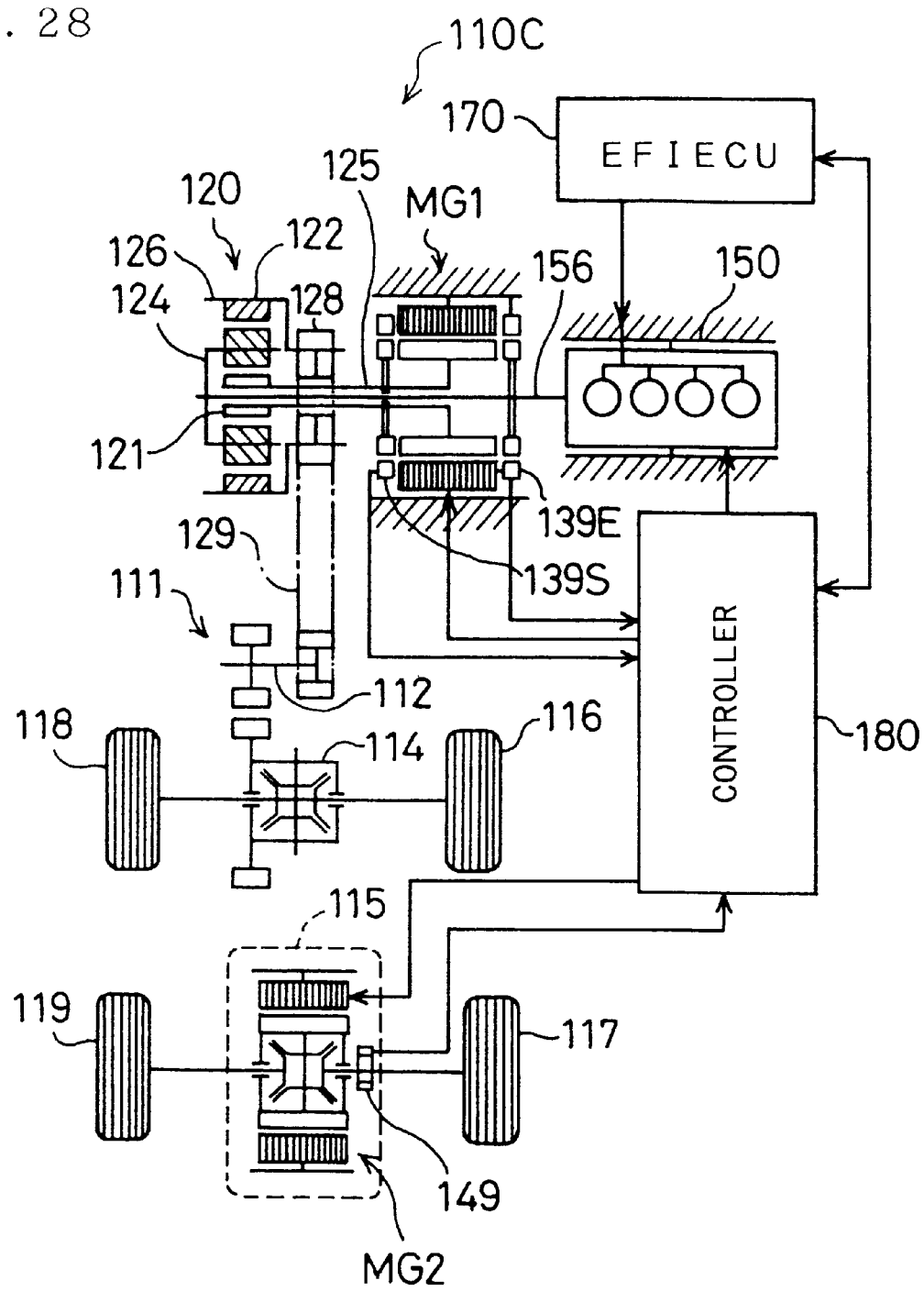
FIG. 28 schematically illustrates structure of a four-wheel-drive vehicle with a power output apparatus 110C incorporated therein.

The power output apparatuses 110 and 110' of the first and the second embodiments and their modified examples discussed above are applied to the FR-type or FF-type two-wheel-drive vehicle. As shown in FIG. 28, however, a power output apparatus 110C given as another modified example is applied to a four-wheel-drive vehicle. In this structure, the second motor MG2 is separated from the ring gear shaft 126 and independently arranged in the rear-wheel portion of the vehicle, so as to drive the rear driving wheels 117 and 119. The ring gear shaft 126 is, on the other hand, connected to the differential gear 114 via the power feed gear 128 and the power transmission gear 111, in order to drive the front driving wheels 116 and 118. Either one of the engine stop control routines shown in FIGS. 7 and 22 is also applicable to this structure.

The power output apparatus 110 of the embodiment and their modified examples discussed above are applied to the FR-type or FF-type two-wheel-drive vehicle. In another modified example of FIG. 28, however, a power output apparatus 110C is applied to a four-wheel-drive vehicle. In this structure, the second motor MG2 is separated from the ring gear shaft 126 and independently arranged in the rear-wheel portion of the vehicle, so as to drive the rear driving wheels 117 and 119. The ring gear shaft 126 is, on the other hand, connected to the differential gear 114 via the power feed gear 128 and the power transmission gear 111, in order to drive the front driving wheels 116 and 118. The engine stop control routine of FIG. 7 is also applicable to this structure.

Permanent magnet (PM)-type synchronous motors are used as the first motor MG1 and the second motor MG2 in the power output apparatus 110 of the embodiment. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the fist and the second driving circuits 191 and 192 in the power output apparatus 110 of the embodiment. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 in the above embodiment may include Pb cells, NiMH cells, Li cells, or the like cells. A capacitor may be used in place of the battery 194.

Figure 29:
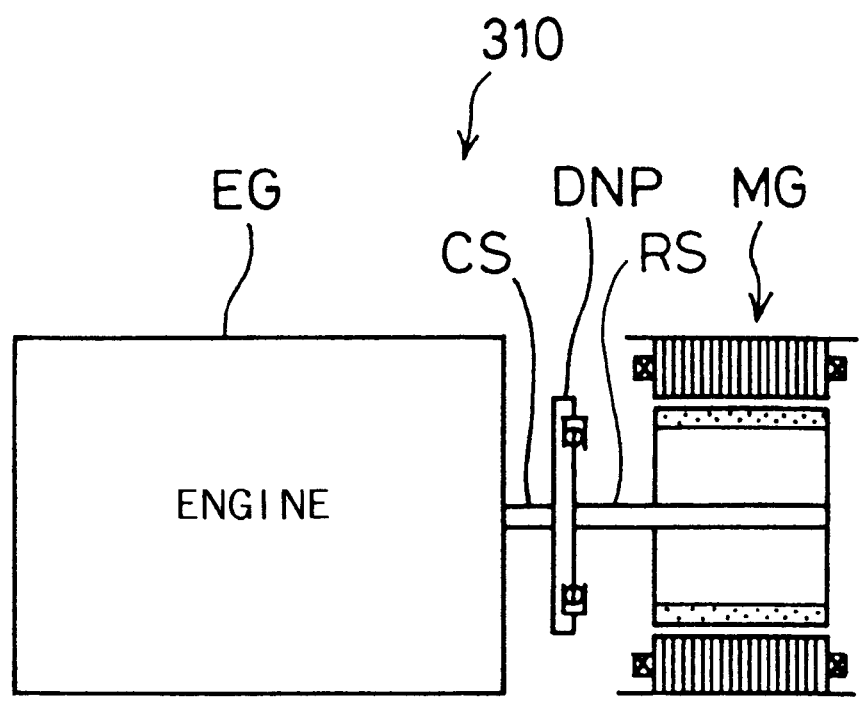
FIG. 29 schematically illustrates another power output apparatus 310 as another modified example.

In the power output apparatus 110 of the embodiment, the crankshaft 156 of the engine 150 is connected to the first motor MG1 via the damper 157 and the planetary gear 120. When the operation of the engine 150 is stopped, the variation in revolving speed Ne of the engine 150 is regulated by the output torque from the first motor MG1 via the planetary gear 120. Like another power output apparatus 310 shown in FIG. 29 as still another modified example, a crankshaft CS of an engine EG is directly connected to a rotating shaft RS of amotor MG via a damper DNP. The variation in revolving speed Ne of the engine EG is regulated by the motor MG when the operation of the engine EG is stopped. This structure exerts the same effects as those of the power output apparatus 110 of the above embodiment. In the above embodiments, the first motor MG1 and the second motor MG2 are arranged to be coaxial with the shaft of power transmission. The arrangement of these motors with respect to the shaft of power transmission may, however, be determined arbitrarily based on the design requirements.

The present invention is not restricted to the above embodiment or its modified examples, but there may be many modifications, changes, and alterations without departing from the scope or spirit of the main characteristics of the present invention. For example, although the power output apparatus is mounted on the vehicle in the above embodiment, it may be mounted on other transportation means like ships and airplanes as well as a variety of industrial machines.

It should be clearly understood that the above embodiment is only illustrative and not restrictive in any sense. The scope and spirit of the present invention are limited only by the terms of the appended claims.

What is claimed is:

1. A power output apparatus for outputting power to a drive shaft, said power output apparatus comprising:

an engine having an output shaft;

a first motor having a rotating shaft and inputting and outputting power to and from said rotating shaft;

a second motor inputting and outputting power to and from said drive shaft;

a parallel hybrid system having a power channel that directly outputs at least a part of the power of the engine to the drive shaft;

fuel stop instruction means for giving an instruction to stop fuel supply to said engine when a condition of stopping operation of said engine is fulfilled; and stop-time control means for applying a torque to said output shaft of said engine and thereby restricting a deceleration of revolving speed of said output shaft to a predetermined range in response to said instruction to stop the fuel supply to said engine, so as to implement a stop-time control for stopping the operation of said engine.

2. A power output apparatus in accordance with claim 1, said power output apparatus further comprising:

target torque storage means for determining a time-based variation in target value of the torque applied to said output shaft of said engine, based on a revolving speed of the engine at the time of stopping the operation of said engine, wherein said stop-time control means comprises:
   means for driving said first motor, as said stop-time control, to apply a torque corresponding to said target value to said output shaft of said engine along a time course after the stop of fuel supply to said engine via said parallel hybrid system.

3. A power output apparatus in accordance with claim 2, said power output apparatus further comprising:

deceleration computing means for computing the deceleration of revolving speed of said output shaft during the course of said stop-time control;

learning means for varying a learned value according to the deceleration computed by said deceleration computing means and storing said learned value; and deceleration range determination means for determining said predetermined range in said stop-time control carried out by said stop-time control means, based on said learned value stored by said learning means.

4. A power output apparatus in accordance with claim 1, said power output apparatus further comprising:

revolving speed detection means for measuring the revolving speed of said output shaft, wherein said stop-time control means further comprises:
   means for driving said first motor, as said stop-time control, in order to enable the revolving speed of said output shaft measured by said revolving speed detection means to approach a predetermined value via a predetermined pathway.

5. A power output apparatus in accordance with claim 1, said power output apparatus further comprising:

revolving speed detection means for measuring the revolving speed of said output shaft, wherein said stop-time control means further comprises:
   means for driving said first motor, as said stop-time control, to apply a torque in reverse of the rotation of said output shaft via said parallel hybrid system to said output shaft, until the revolving speed of said output shaft measured by said revolving speed detection means becomes coincident with said predetermined value.

6. A power output apparatus in accordance with claim 5, wherein said stop-time control means further comprises means for driving said first motor, as part of said stop-time control, to apply a predetermined torque in the direction of rotation of said output shaft via said parallel hybrid system to said output shaft, when the revolving speed of said output shaft measured by said revolving speed detection means decreases to a reference value, which is not greater than said predetermined value.

7. A power output apparatus in accordance with claim 5, said power output apparatus further comprising:

deceleration computing means for computing the deceleration of revolving speed of said output shaft during the course of said stop-time control; and reference value setting means for setting a larger value to said reference value against a greater absolute value of the deceleration.

8. A power output apparatus in accordance with claim 5, said power output apparatus further comprising:

braking force detection means for determining magnitude of a braking force applied to said drive shaft during the course of said stop-time control; and reference value setting means for setting a larger value to said reference value when said braking force detection means determines that the braking force has a large magnitude.

9. A power output apparatus in accordance with claim 5, wherein said predetermined value is a revolving speed that is lower than a resonance range of torsional vibrations in a system including said output shaft and said parallel hybrid system.

10. A power output apparatus in accordance with claim 1, said power output apparatus further comprising:

second motor control means for driving said second motor to continue power input and output to and from said drive shaft, when said instruction to stop the operation of said engine is given in the course of continuous power input and output to and from said drive shaft.

11. An engine controller comprising an engine for outputting power through combustion of a fuel and a motor connected to an output shaft of said engine via a damper, said engine controller controlling operation and stop of said engine and comprising:

fuel stop means for stopping fuel supply to said engine when a condition to stop the operation of said engine is fulfilled; and stop-time control means for applying a torque to said output shaft of said engine and thereby restricting a deceleration of revolving speed of said output shaft to a predetermined range in response to the stop of fuel supply to said engine, so as to implement a stop-time control for stopping the operation of said engine.

12. An engine controller in accordance with claim 11, said engine controller further comprising:

target torque storage means for determining a time-based variation in target value of the torque applied by said motor to said output shaft of said engine, based on a revolving speed of the engine at the time of stopping the operation of said engine, wherein said stop-time control means comprises:
means for driving said motor, as said stop-time control, to apply a torque corresponding to said target value to said output shaft of said engine along a time course after the stop of fuel supply to said engine.

13. An engine controller in accordance with claim 12, said engine controller further comprising:

deceleration computing means for computing the deceleration of revolving speed of said output shaft during the course of said stop-time control;

learning means for varying a learned value according to the deceleration computed by said deceleration computing means and storing said learned value; and deceleration range determination means for determining said predetermined range in said stop-time control carried out by said stop-time control means, based on said learned value stored by said learning means.

14. An engine controller in accordance with claim 11, said engine controller further comprising:

revolving speed detection means for measuring the revolving speed of said output shaft, wherein said stop-time control means further comprises:
means for driving said motor, as said stop-time control, in order to enable the revolving speed of said output shaft measured by said revolving speed detection means to approach a predetermined value via a predetermined pathway.

15. An engine controller in accordance with claim 11, said engine controller further comprising:

revolving speed detection means for measuring the revolving speed of said output shaft, wherein said stop-time control means comprises:
means for driving said motor, as said stop-time control, to apply a torque in reverse of the rotation of said output shaft to said output shaft, until the revolving speed of said output shaft measured by said revolving speed detection means becomes coincident with said predetermined value.

16. An engine controller in accordance with claim 11, said engine controller further comprising:

revolving speed detection means for measuring the revolving speed of said output shaft, wherein said stop-time control means further comprises means for driving said motor, as part of said stop-time control, to apply a predetermined torque in the direction of rotation of said output shaft to said output shaft, when the revolving speed of said output shaft measured by said revolving speed detection means decreases to a reference value, which is not greater than said predetermined value.

17. An engine controller in accordance with claim 15, said engine controller further comprising:

deceleration computing means for computing the deceleration of revolving speed of said output shaft during the course of said stop-time control; and reference value setting means for setting a larger value to said reference value against a greater absolute value of the deceleration.

18. An engine controller in accordance with claim 15, wherein said predetermined value is a revolving speed that is lower than a resonance range of torsional vibrations in a system including said output shaft and a rotor of said motor.

19. A method of controlling a power output apparatus, which comprises: an engine having an output shaft; a first motor having a rotating shaft and inputting and outputting power to and from said rotating shaft; a second motor inputting and outputting power to and from a drive shaft; and a parallel hybrid system having a power channel that directly outputs at least a part of the power of the engine to the drive shaft, said method comprising the steps of:

giving an instruction to stop fuel supply to said engine when a condition of stopping operation of said engine is fulfilled; and applying a torque to said output shaft of said engine and thereby restricting a deceleration of revolving speed of said output shaft to a predetermined range in response to said instruction to stop the fuel supply to said engine, so as to implement a stop-time control for stopping the operation of said engine.

20. A method of controlling stop of an engine, said engine outputting power through combustion of a fuel and having an output shaft connected to a motor, said method comprising the steps of:

stopping fuel supply to said engine when a condition to stop operation of said engine is fulfilled; and
applying a torque to said output shaft of said engine and thereby restricting a deceleration of revolving speed of said output shaft to a predetermined range in response to the stop of fuel supply to said engine, so as to implement a stop-time control for stopping the operation of said engine.

21. A parallel hybrid vehicle, comprising:

an internal combustion engine having an output shaft;

a generator that is driven with at least a part of the power output from said internal combustion engine;

a motor that is operated with the electric power generated by said generator and outputs at least a part of its power to a drive shaft;

a first unit that operates said generator so as to allow said generator to generate power, while said internal combustion engine is being operated; and a second unit that switches to power operation of said generator so as to control the deceleration of the revolving speed of the output shaft of said internal combustion engine within a predetermined range, when stopping the operation of said internal combustion engine.

22. An engine controller comprising an engine for outputting power through combustion of a fuel and a motor connected to an output shaft of said engine, said engine controller controlling operation and stop of said engine and comprising:

fuel stop means for stopping fuel supply to said engine when a condition to stop the operation of said engine is fulfilled; and stop-time control means for applying a torque to said output shaft of said engine and thereby restricting a deceleration of revolving speed of said output shaft to a predetermined range in response to the stop of fuel supply to said engine, so as to implement a stop-time control for stopping the operation of said engine.

* * * * *